(12) United States Patent
Wood

(10) Patent No.: US 9,882,877 B2
(45) Date of Patent: Jan. 30, 2018

(54) TRANSPARENT TRAFFIC CONTROL DEVICE AND METHOD FOR SECURING INTERNET-CONNECTED DEVICES

(71) Applicant: Michael C. Wood, Lazy Lake, FL (US)

(72) Inventor: Michael C. Wood, Lazy Lake, FL (US)

(*) Notice: Subject to any disclaimer, the term of this patent is extended or adjusted under 35 U.S.C. 154(b) by 0 days.

(21) Appl. No.: 15/206,594

(22) Filed: Jul. 11, 2016

(65) Prior Publication Data
US 2016/0337313 A1   Nov. 17, 2016

Related U.S. Application Data

(63) Continuation-in-part of application No. 14/706,459, filed on May 7, 2015, now Pat. No. 9,467,324.

(60) Provisional application No. 61/991,828, filed on May 12, 2014, provisional application No. 62/192,365, filed on Jul. 14, 2015, provisional application No. 62/211,379, filed on Aug. 28, 2015.

(51) Int. Cl.
| | | |
|---|---|---|
| *H04L 29/06* | (2006.01) | |
| *H04L 12/721* | (2013.01) | |
| *H04L 29/08* | (2006.01) | |
| *H04L 29/12* | (2006.01) | |

(52) U.S. Cl.
CPC .......... *H04L 63/0227* (2013.01); *H04L 45/66* (2013.01); *H04L 61/1511* (2013.01); *H04L 61/2038* (2013.01); *H04L 61/2069* (2013.01); *H04L 61/6022* (2013.01); *H04L 63/0236* (2013.01); *H04L 63/101* (2013.01); *H04L 63/1408* (2013.01); *H04L 67/12* (2013.01)

(58) Field of Classification Search
CPC ..... H04L 63/0227; H04L 45/66; H04L 67/12; H04L 61/6022; H04L 61/2038; H04L 61/2069; H04L 63/101; H04L 63/0236; H04L 63/1408; H04L 61/1511
See application file for complete search history.

(56) References Cited

U.S. PATENT DOCUMENTS

| | | | |
|---|---|---|---|
| 6,405,242 B1 | 6/2002 | Watanabe et al. | |
| 6,891,887 B1 | 5/2005 | Dobson | |

(Continued)

OTHER PUBLICATIONS

Sean, Wilkins, "Advanced ACL Configuration", Apr. 18, 2011, http://www.pearsonitcertification.com/articles/article.aspx?p=1701057.*

(Continued)

*Primary Examiner* — Chau Le
(74) *Attorney, Agent, or Firm* — Johnson & Martin, P.A.; James David Johnson

(57) ABSTRACT

A firewall security platform is provided for enhancing security of a network. The firewall security platform includes at least one interface to communicate the identity and current status of one or more traffic requesters and at least one device for receiving instructions from a user. Communication data packets associated with the one or more traffic requesters are allowed for communication via the network or denied and blocked by the firewall security platform based on the current status of each of the one or more traffic requesters. The user's instructions include making a selection, with the selection including members that are at least one of the one or more traffic requesters. The current status of each member of the selection is altered in response to the making of the selection.

33 Claims, 14 Drawing Sheets

(56) References Cited

U.S. PATENT DOCUMENTS

| | | | |
|---|---|---|---|
| 7,093,287 B1* | 8/2006 | Gusler | H04L 63/0227 707/999.1 |
| 8,402,528 B1* | 3/2013 | McCorkendale | G06F 8/65 726/11 |
| 9,397,978 B1* | 7/2016 | Cha | H04L 63/0236 |
| 9,467,324 B2* | 10/2016 | Wood | H04L 29/06 |
| 9,742,734 B2* | 8/2017 | Wood | H04L 63/0236 |
| 2002/0010869 A1* | 1/2002 | Kim | H04L 29/12009 726/13 |
| 2007/0016945 A1* | 1/2007 | Bassett | H04L 63/0263 726/11 |
| 2007/0033645 A1* | 2/2007 | Jones | H04L 29/12009 726/12 |
| 2007/0157302 A1* | 7/2007 | Ottamalika | H04L 63/0263 726/11 |
| 2009/0074413 A1 | 3/2009 | Bannai et al. | |
| 2011/0231890 A1* | 9/2011 | Tovar | G06F 21/604 726/1 |
| 2012/0096261 A1* | 4/2012 | Ko | H04L 63/0236 713/168 |
| 2012/0151364 A1* | 6/2012 | Chueh | H04L 12/66 715/736 |
| 2012/0213094 A1 | 8/2012 | Zhang et al. | |
| 2013/0318603 A1* | 11/2013 | Merza | H04L 63/1441 726/22 |
| 2014/0331318 A1* | 11/2014 | Windsor | H04L 63/1441 726/22 |
| 2015/0067816 A1 | 3/2015 | Rados et al. | |
| 2015/0215089 A1 | 7/2015 | Yan et al. | |

OTHER PUBLICATIONS

Keith, Snazel, "Adding security to your WIFI network with a MAC whitelist", Jul. 11, 2013, https://snaz.com/adding-security-to-your-wifi-network-with-a-mac-white-list/.*

Cisco, "Cisco Adaptive Security Device Manager Version 5.2", Jun. 13, 2006, http://www.cisco.com/c/en/us/products/collateral/security/pix-500-series-security-appliances/product_data_sheet0900aecd804ba978.html.*

* cited by examiner www.apple.com
images.apple.com
metrics.apple.com
* * 3

*Fig. 10* www.apple.com
images.apple.com
metrics.apple.com

*Fig. 9*

Fig. 11 www.apple.com
images.apple.com
***metrics.apple.com
***www.mail.com
***i0.mail.com
cdn.optimizely.com
s.uicdn.com
***www. bankrate.com
as.ebz.io
***i2.mail.com
8163535.log.optimizely.com
www.googletagservices.com
partner. googleleadservices.com
tags.bluekai.com
us.wa.ui-portal.com
* b.scorecardresearch.com**
a.triggit.com
d.ptd.com
ww1.5 collserve.com
t.mookie1.com
d.turn.com

Fig. 12 www.apple.com
images.apple.com
-->metrics.apple.com
www.mail.com
i0.mail.com
cdn.optimizely.com
s.uicdn.com
www. bankrate.com
as.ebz.io
i2.mail.com
8163535.log.optimizely.com
www.googletagservices.com
partner. googleleadservices.com
tags.bluekai.com
us.wa.ui-portal.com
b.scorecardresearch.com
a.triggit.com
d.ptd.com
ww1.5 collserve.com
t.mookie1.com
d.turn.com www.apple.com
images.apple.com
-->metrics.apple.com www.mail.com
i0.mail.com
cdn.optimizely.com [2]
s.uicdn.com
www.bankrate.com
as.ebz.io
i2.mail.com
8163535.log.optimizely.com
www.googletagservices.com
partner.googleleadservices.com
tags.bluekai.com [2]
us.wa.ui-portal.com
b.scorecardresearch.com
a.triggit.com
d.ptd.com
ww1.5 collserve.com
t.mookie1.com
d.turn.com

*Fig. 13*

TRANSPARENT TRAFFIC CONTROL DEVICE AND METHOD FOR SECURING INTERNET-CONNECTED DEVICES

CROSS-REFERENCE TO RELATED APPLICATIONS

This application is a nonprovisional application of and claims priority from U.S. nonprovisional patent application Ser. No. 14/706,459 filed on May 7, 2015, which claimed priority to U.S. provisional patent application Ser. No. 61/991,828 filed on May 12, 2014, and also to U.S. provisional patent application Ser. No. 62/192,365 filed on Jul. 14, 2015 and U.S. provisional patent application Ser. No. 62/211,379 filed on Aug. 28, 2015. The foregoing applications are incorporated in their entirety herein by reference.

FIELD OF THE INVENTION

The present invention relates to systems and methods for network security, and, more specifically, to firewalls and systems for providing online security. The invention relates to methods and devices for securing Internet-connected devices. More particularly, the invention relates to methods, devices, and associated software for securing Internet-connected consumer devices from hacking and other online security threats.

BACKGROUND

A rapidly growing trend is underway to incorporate Internet connectivity within all home electronics. In fact, Internet connectivity is already available for a plethora of "Internet of Thing" ("IoT") devices including, but not limited to, televisions, printers, home security cameras, motion detectors, home alarm systems, thermostats, light bulbs, and even appliances (not to mention home computers, tablets, and smart phones). The cybersecurity industry has not successfully developed a highly secure yet easy-to-use security methodology for individual computers. Now, with an innumerable number of home electronics coming online, the security issues appear to become exponentially more complex with each and every new device added. However, such exponential complexity only applies to prior security methodologies.

Some smart televisions contain built-in cameras and microphones. Hackers have been able to use these components to spy on people, watching or recording everything they do in front of the television and listening to or recording everything they say. Criminals have hacked into home motion detectors to determine living patterns. They have used this information to determine when homes are usually empty and then to plan their burglaries using this information. Criminals can also hack alarm systems, temporarily shutting them down and even altering their logs to conceal the temporary shutdown. Such methods allow burglars to enter, burglarize, and exit—all without a trace.

Unfortunately, getting products to market has been a much higher priority for manufacturers than providing robust security. The security of Internet-based electronics is often an afterthought—including the Internet security of security products themselves (e.g., alarm systems, security cameras, etc.). Moreover, should manufacturers begin to take security more seriously, each product would then have its own unique security mechanism which would add a significant burden to the consumer both from the perspective of learning to operate the device and its security functions as well as due to the added cost of incorporating such security measures, which manufacturers invariably would pass on to consumers.

A need exists for securing Internet-enabled consumer devices in the developing and rapidly expanding Internet of Things while maintaining the ease of use and configuration of such devices for consumers who use them.

SUMMARY OF THE INVENTION

An aspect of the invention advantageously provides an easy-to-use firewall that substantially secures a network. An aspect of the invention advantageously provides a firewall that can be based on a dynamically updatable Deny-All Approach. An aspect of the invention advantageously provides a firewall that is customizable to accommodate user traffic. An aspect of the invention advantageously provides a firewall that integrates DNS traffic monitoring with traffic control over non-DNS data packets.

One aspect of the present disclosure provides an easy-to-use, "Deny-All Approach" that is applicable to the unique characteristics of web-browser traffic (in addition to providing "Deny-All Approach" protection for other Internet-based applications as well). This is accomplished, in part, through tightly integrating a novel method of traffic monitoring with a novel method of traffic control. The present disclosure may create a "Traffic Requester" group. A Traffic Requester group includes at least one domain name derived from the internal contents of at least one DNS packet combined with at least one domain name associated with either the source IP Address and/or destination IP address of at least one non-DNS-based packet. The identity of each traffic requester communicated to the user may include the domain name itself, or a derivative of the domain name, or a pseudonym associated with the domain name, or the like. A Traffic Requester Name can be the domain name and/or a derivative or variation thereof. A Traffic Requester Name can alternatively or also be the identity of the owner of the domain (e.g., "Google Inc." or simply "Google" in lieu of or in addition to the domain name "Gstatic.com").

The novel traffic monitoring method may display these Traffic Requesters in real-time—whether such Traffic Requester is currently allowed or blocked. The novel traffic control method operates off a dynamically changing list of blocked and allowed domain names. Moreover, one implementation of the present invention initially begins with a "Deny-All Approach"; from that point forward users may dynamically toggle the status of displayed Traffic Requesters using the novel traffic monitoring method.

According to an embodiment of this disclosure, the invention features a system for securing an Internet-connected device from an online security threat. The system can include at least one Internet-connected device, a transparent traffic control (TTC) device for receiving and either allowing or blocking at least one data packet destined for the at least one Internet-connected device, a network connection that communicatively connects the TTC device to the at least one Internet-connected device, and a communications network for transmitting the at least one data packet to and from the TTC device.

In another aspect, the invention can feature the TTC device displaying a traffic requester name and associated current status representing the at least one Internet-connected device when the at least one Internet-connected device attempts to communicate with the communications network.

In another aspect, the invention can feature the TTC device being a computer, a server, or any other suitable computing device.

In another aspect, the invention can feature the Internet-connected device being a computer, a server, a tablet computer, a smart phone, a cellular phone, a television, a radio, a stereo, a home entertainment system, a cable box, a satellite television box, a speaker, a printer, a camera, a telephone, a GPS device, a home security camera, a motion detector, a home alarm system or device, a thermostat, a timer, a light timer, a sprinkler system, a sprinkler system timer, a light bulb, a household appliance, a power outlet, a power switch, a wall plug adapter, a scale, an electronic fitness wristband, a wearable fitness device, a remote health monitoring device, a remote heart rate monitor, a remote blood pressure monitor, a remote blood sugar monitor, an automobile, a manufacturing device, an environmental monitoring device, a traffic monitoring device, or any other suitable device having a connection to the Internet.

In another aspect, the invention can feature the system including a searchable data structure that includes at least one recognized media access control (MAC) address.

In another aspect, the invention can feature the searchable data structure being a MAC group structure, an array, a binary tree, a linked list, a red-black tree, a table, or any other searchable data structure for organizing data that includes the at least one MAC address.

In another aspect, the invention can feature each at least one MAC address being assignable to a TTC group ID of one or more TTC group IDs. The one or more TTC group IDs can include at least one known MAC address. One or more new TTC group IDs are creatable using the TTC device.

In another aspect, the invention can feature, for each at least one data packet received by the TTC device, the TTC device performing a check to determine whether the at least one MAC address associated with each such at least one data packet is a MAC address that is known to the TTC device or a new and unknown MAC address, wherein the check is performed by searching the searchable data structure for the presence of the at least one MAC address.

In another aspect, the invention can feature, if the at least one MAC address of the at least one data packet received by the TTC device is known, the TTC device determining to which TTC group ID of the one or more TTC group IDs the at least one MAC address of the at least one data packet is assigned based on MAC address data in the searchable data structure.

In another aspect, the invention can feature, if the at least one MAC address of the at least one data packet received by the TTC device is new and unknown, the TTC device permitting the at least one MAC address to be assigned to an existing TTC group ID or to a new TTC group ID that must be created.

In another aspect, the invention can feature the system further including a display monitor. The TTC device can be usable to assign each TTC group ID a unique annotation that is viewable on the display monitor. A unique annotation can be assignable to the new TTC group ID. The unique annotation can indicate both the TTC group ID and a current status that visually indicates whether the at least one data packet from the at least one MAC address is allowed or blocked.

In another aspect, the invention can feature the current status that is allowed resulting in the TTC device permitting communication of the at least one data packet from an allowed MAC address assigned to an allowed TTC group ID having a unique annotation that indicates the current status as allowed. The status that is blocked can result in the TTC device denying communication of the at least one data packet from a blocked MAC address assigned to a blocked TTC group ID having a unique annotation that indicates the current status as blocked.

In another aspect, the invention can feature, if the at least one data packet originates from a MAC address associated with a TTC group ID having a current status that is allowed, the at least one data packet being forwarded to the at least one Internet-connected device. If the at least one data packet originates from a MAC address associated with a TTC group ID having a current status that is blocked, the at least one data packet can be discarded and not forwarded to the at least one Internet-connected device.

In another aspect, the invention can feature the system allowing or blocking a process for which initiation is sought by a mouse click by a user by allowing or blocking the user's mouse click.

The invention can also feature a transparent traffic control (TTC) device for securing an Internet-connected device from an online security threat. The TTC device can include a device for receiving at least one data packet destined for the at least one Internet-connected device, a device for either allowing or blocking the transmission of the at least one data packet based on a media access control (MAC) address associated with the at least one data packet, and a searchable data structure for storing MAC address data related to MAC addresses that the TTC device recognizes as known, wherein each MAC address is associated in the searchable data structure with a TTC group ID of a group of one or more TTC group IDs. The TTC device further includes an interface for assigning each MAC address to one TTC group ID of the group of one or more TTC group IDs and for designating each TTC group ID of the group of one or more TTC group IDs as having an allow status or a block status. The device for either allowing or blocking the transmission of the at least one data packet allows the transmission of the at least one data packet if the MAC address of the at least one data packet is associated with a TTC group ID assigned the allow status and blocks the transmission of the at least one data packet if the MAC address of the at least one data packet is associated with a TTC group ID assigned the block status.

In another aspect, the invention can feature the TTC device also controlling the transmission of a data packet being transmitted by the Internet-connected device to another device connected to a communications network to which the TTC device is connected.

In another aspect, the invention can feature the TTC device being communicatively connected to the Internet-connected device by a network connection capable of transmitting data packets to or from the TTC device.

In another aspect, the invention can feature the TTC device being communicatively connected to a communications network for transmitting the at least one data packet to and from the TTC device to another device connected to the communications network.

In another aspect, the invention can feature a display monitor, wherein the allow status and block status are each visually represented on the display monitor.

The invention can also feature a transparent traffic control (TTC) system for securing an Internet-connected device from an online security threat. The system can include a TTC device that translates one or more remote IP addresses contained in one or more data packets that desire to enter or exit one or more network interface cards into one or more traffic requester names. The system can also include a display connected to the TTC device for dynamically displaying one or more traffic requester names and their associated status at the time each of the one or more data packets attempts to enter or exit the one or more network interface cards. The TTC device can include an interface viewable on the display to allow a user to change the status of one or more of the one or more traffic requester names at the time each of the one or more data packets attempts to enter or exit the one or more network interface cards.

In another aspect, the invention can feature the one or more traffic requester names including at least one domain name.

In another aspect, the invention can feature the one or more traffic requester names including at least one domain name owner's name.

According to an embodiment of the present disclosure, a method of the invention can be used for securing an Internet-connected device from an online security threat. The method includes the steps of: (a) installing a transparent traffic control (TTC) device so that the TTC device is communicatively connected to a communications network and also to a network connection that communicatively connects the TTC device to an Internet-connected device; (b) using the TTC device, intercepting a data packet transmitted to the Internet-connected device via the communications network from a media access control (MAC) address; (c) performing a check by the TTC device to determine the MAC address of the data packet; (d) searching a searchable data structure for storing MAC address data related to MAC addresses that the TTC device recognizes as known to locate the MAC address of the intercepted data packet, wherein each MAC address is associated in the searchable data structure with a TTC group ID of a group of one or more TTC group IDs; and (e) if the MAC address is known being represented in the MAC address data stored in the searchable data structure, forwarding the data packet to the Internet-connected device if the MAC address is assigned to one of the TTC group IDs having a current status that is allowed and discarding the data packet if the MAC address is assigned to one of the TTC group IDs having a current status that is blocked.

In another method of the invention, if the MAC address is new and unknown as determined by its absence from the MAC address data stored in the searchable data structure, the method can include the step of: (f) assigning the MAC address to a TTC group ID, wherein the TTC group ID includes an existing TTC group ID or a new TTC group ID that is created.

In another method of the invention, the method can include the steps of: (g) assigning a unique annotation to each TTC group ID; and (h) visually displaying the unique annotation for each TTC group ID, along with the current status for each TTC group ID, on an interface that is viewable on a display monitor connected to the TTC device.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

BRIEF DESCRIPTION OF THE DRAWINGS

FIG. 9 is a table view of a list of traffic requesters, according to an embodiment of this disclosure.

FIG. 10 is a table view of a list of traffic requesters with unblocking indications, according to an embodiment of this disclosure.

FIG. 11 is a table view of a list of annotated active talkers, according to an embodiment of this disclosure.

FIG. 12 is a table view of a list of annotated repeat talkers, according to an embodiment of this disclosure.

FIG. 13 is a table view of a list of website activity, according to an embodiment of this disclosure.

DETAILED DESCRIPTION

Figure 1:
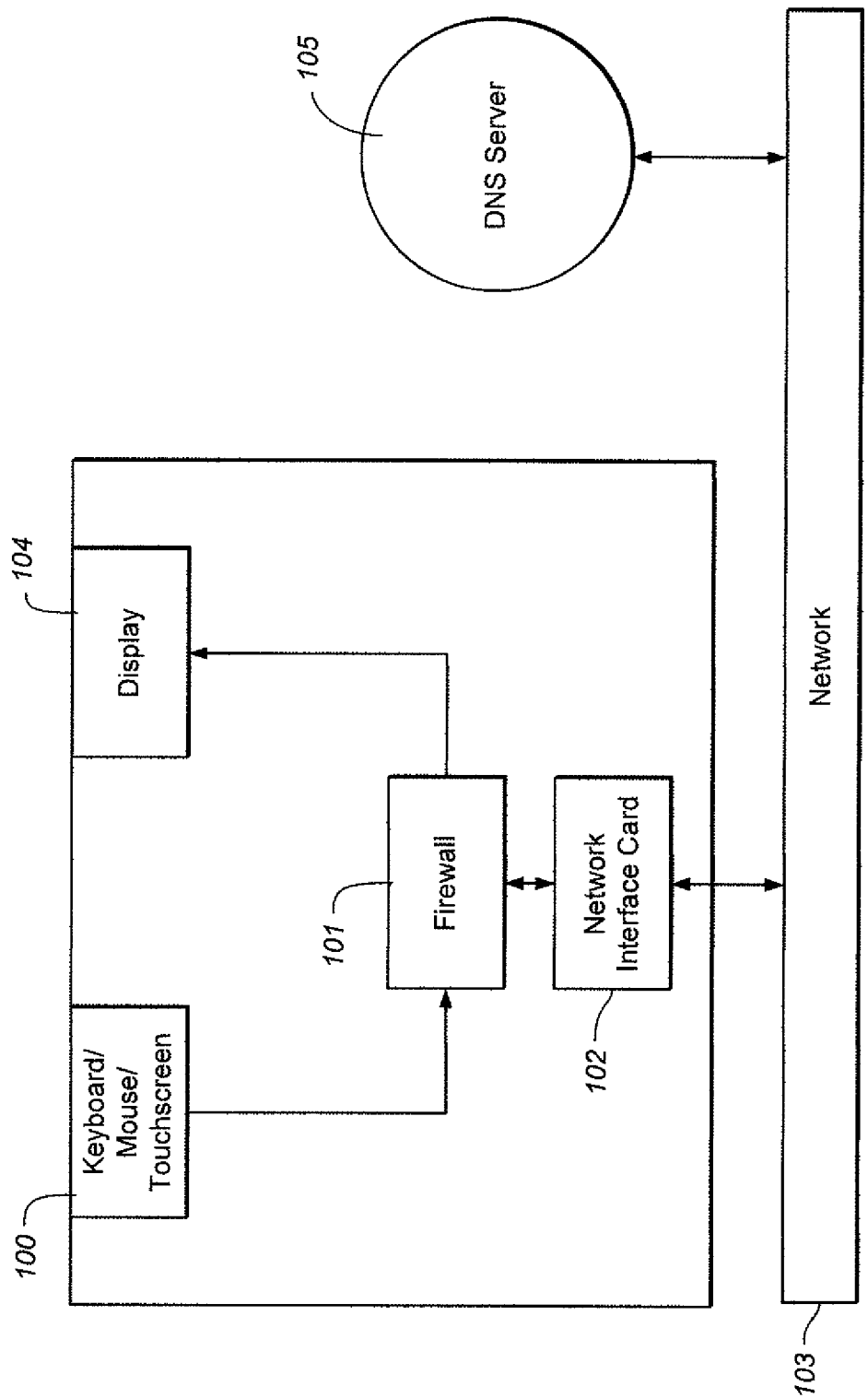
FIG. 1 is a block diagram view of an illustrative hardware system for operating the firewall, according to an embodiment of this disclosure.
Figure 2:
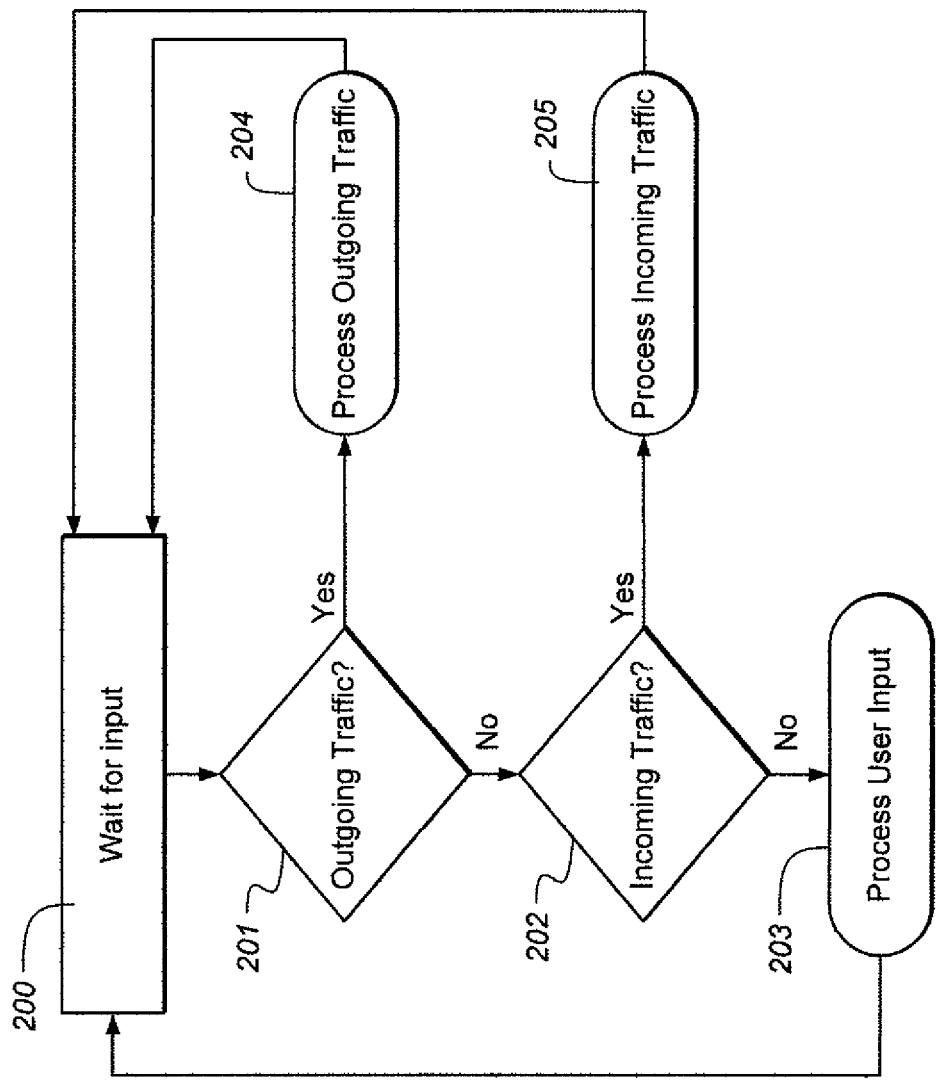
FIG. 2 is a flowchart view of an event-driven process, according to an embodiment of this disclosure.

The present invention is best understood by reference to the detailed drawings and description set forth herein. Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

Referring now to FIGS. 1-13, the firewall security system for computers with internet access will now be discussed in more detail. The firewall security system may alternatively be referenced as a network security enhancement system without limitation. The firewall security system may be communicably located between an application, for example, and operating system, and a network interface of a computer. Alternatively, the firewall security system may be external to a computer, for example, between the network interface and an internet access device such as a modem, router, or other device. The system may include a firewall security platform, and authentication platform, and an interface. The firewall security platform may include a DNS authentication process, a domain name validation process, and a domain name reply integrity process. The firewall platform may analyze a communication data packet, which may include comparing data to a Traffic Requester group. The system may operate one or more of these components interactively with other components to provide firewall and online security.

To permanently end computer hacking, computer operators must be able to monitor and control all traffic going in and out of their computers. The longstanding challenge has been to find a way to group and display traffic such that every data packet is accounted for without the user being overloaded with too much information. The other longstanding challenge has been to find a convenient method which empowers a user to substantially immediately respond to the information. This present invention solves both longstanding issues.

Internet-based computers can typically only talk to one another using numeric addresses (called IP Addresses). However, computer users do not typically use numeric IP addresses. Rather, they typically use domain names instead (e.g. www.apple.com). In order for the user's computer to communicate with the chosen site, the user's computer generally must first translate the domain name (e.g. www.apple.com) into a numeric IP Address (e.g. 17.178.96.59).

Owners of internet sites may register their numeric IP addresses and associated domain names with devices called DNS servers. For example, Apple has registered with DNS servers that www.apple.com is located at 17.178.96.59. The moment the DNS registration is complete, the user's computer can immediately obtain the IP Address of the site by querying a DNS Server, for example, via a DNS request.

For example, when a user enters a domain name into a browser (e.g. www.apple.com) the user's computer sends a DNS request to a DNS server. In essence, a DNS request asks the DNS server: "What is the IP Address of the following domain name?" For example, when a user enters www.apple.com into a browser, the user's computer sends a DNS request which essentially asks: "What is the IP Address of www.apple.com?"

The DNS Server responds to each DNS request using a DNS reply for its corresponding DNS request. The time between a DNS request and a corresponding DNS reply will be referred to throughout this disclosure as a window. In essence, a DNS reply says: "The IP address for the following domain name is . . . " For example, when a DNS request is sent for www.apple.com, the DNS server will send back a DNS reply which essentially says: "The IP address for www.apple.com is 17.178.96.59." The user's computer can now talk to www.apple.com via this numeric address. (It should be noted that domain names often have more than one IP address. In such instances, a DNS reply will contain multiple IP addresses. The user's computer is free to choose to use any of these IP Addresses when communicating with the chosen domain name.)

The present disclosure treats these DNS Data Packets as a distinct category of communication. The present disclosure can also treat requests/replies for domain owner identifications (such as Whois requests, access of public or proprietary databases, etc.) as distinct categories of communication. The other two categories are Local Data Packets and Remote Data Packets. Internet-based computers often use a local network connection to talk to a router. This local traffic may remain solely between the user's computer and the router. (In other words, the router generally does not pass this traffic onto the internet.) Therefore, these Local Data Packets generally are not viewable to internet-based hackers. Typically, only packets coming from and/or destined for the internet (i.e. Remote Data Packets) are viewable by internet-based hackers. Thus, the present disclosure treats the following types of communication data packets to include distinct categories of traffic: DNS Data Packets, Local Data Packets, and Remote Data Packets. The communication data packets may be characterized via a traffic processor, which may operate as a component of the firewall security platform. Skilled artisans will appreciate additional types of data packets includable as a communication data packet after having the benefit of this disclosure.

Internet computers may use a communication language, for example, TCP/IP and/or UDP/IP. The designers of this communication language have reserved specific numeric address ranges for local traffic (as is well known in the art). The present disclosure uses the reserved local address ranges to identify Local Data Packets (as is also well known in the art). All other address ranges are presumed to be either destined for or coming from the internet. Therefore, in the interest of clarity for this disclosure, all other address ranges are presumed to be Remote Data Packets Skilled artisans will appreciate additional embodiments in which ranges of IP addresses can be otherwise classified, without limitation.

In addition to the internal division and processing of Data Packets, the present disclosure also provides a novel grouping of domain names (i.e., Traffic Requester Names) for external display. This novel grouping is entitled Traffic Requesters. The domain names for the Traffic Requesters group is derived from three sources: the domain name associated with the destination IP address of outbound traffic, the domain name associated with the source IP address of inbound traffic, and the domain name embedded within DNS requests and replies. To qualify as a Traffic Requester group, there has to be at least one domain name derived from the internal contents of at least one DNS packet and there has to be at least one domain name associated with the source IP Address and/or destination IP address of at least one non-DNS-based packet. These domain names and/or names of domain name owners or registrants are members of the Traffic Requester group.

By merging the domain names embedded within DNS packets with domain names associated with IP addresses of non-DNS traffic, users are presented with a real-time list of Traffic Requesters. Users also are presented the identity and status of each Traffic Requester substantially instantaneously, which approximates real-time (e.g. "allowed/authorized" or "blocked/unauthorized"). Should the user desire to change the status of any Traffic Requester, the user can toggle the status of each Traffic Requester via a user input device, for example, with the single click of a mouse (in a mouse-driven implementation), a single tap of the screen (in a touchscreen implementation), etc. The user may provide instructions including a selection to the system via the device.

FIGS. 1-9 illustrate one embodiment of the present disclosure. The initial state of this embodiment blocks all Remote Data Packets (allowing only DNS Data Packets and Local Data Packets to pass through). Thus, this particular embodiment may implement a "Deny-All Approach" (at least in terms of internet-bound traffic) with the sole exception of DNS packets. Alternatively, packets necessary to identify the owner of domain names may also be allowed in the initial state even in "Deny All" mode. Therefore, the illustrated embodiment is one implementation for preventing internet-based hackers from accessing and/or controlling a user's computer. (It also may prevent hackers from being able to use malware to leak sensitive information off the user's computer via the internet.)

While the embodiment in FIGS. 1-9 implements a "Deny All Approach" (the highest possible form of security), ease-of-use has also been fully preserved. The user is provided an intuitive presentation of all Traffic Requesters via an interface—allowing the user to toggle the status of each Traffic Requester via a decision to allow or deny the communication, for example, with a single mouse click. In short, maximum security may be achieved along with maximal ease-of-use at the same time.

FIG. 1 illustrates the firewall device's control of and response to various hardware components. The illustrated embodiment directly controls one or more network interface cards 102 and one or more display interfaces 104. This particular embodiment directly responds to user input from a user input device, such as a keyboard, mouse or touchscreen 100; it also responds to each communication data packet attempting to leave or enter each network interface card 102 Skilled artisans will appreciate that a device that provides an input (i.e., a user input device) may include a mouse, trackball, pointing device, keyboard, joystick, gamepad, jog, dial, camera, button, switch, controller, voice command, microphone, touch screen, or other device that would be apparent to a skilled artisan after having the benefit of this disclosure.

The illustrated embodiment waits 200 until it receives one of three types of input: outgoing traffic 201, incoming traffic 202, or user input 203. Each type of input initiates a different process 203, 204, 205.

Figure 3:
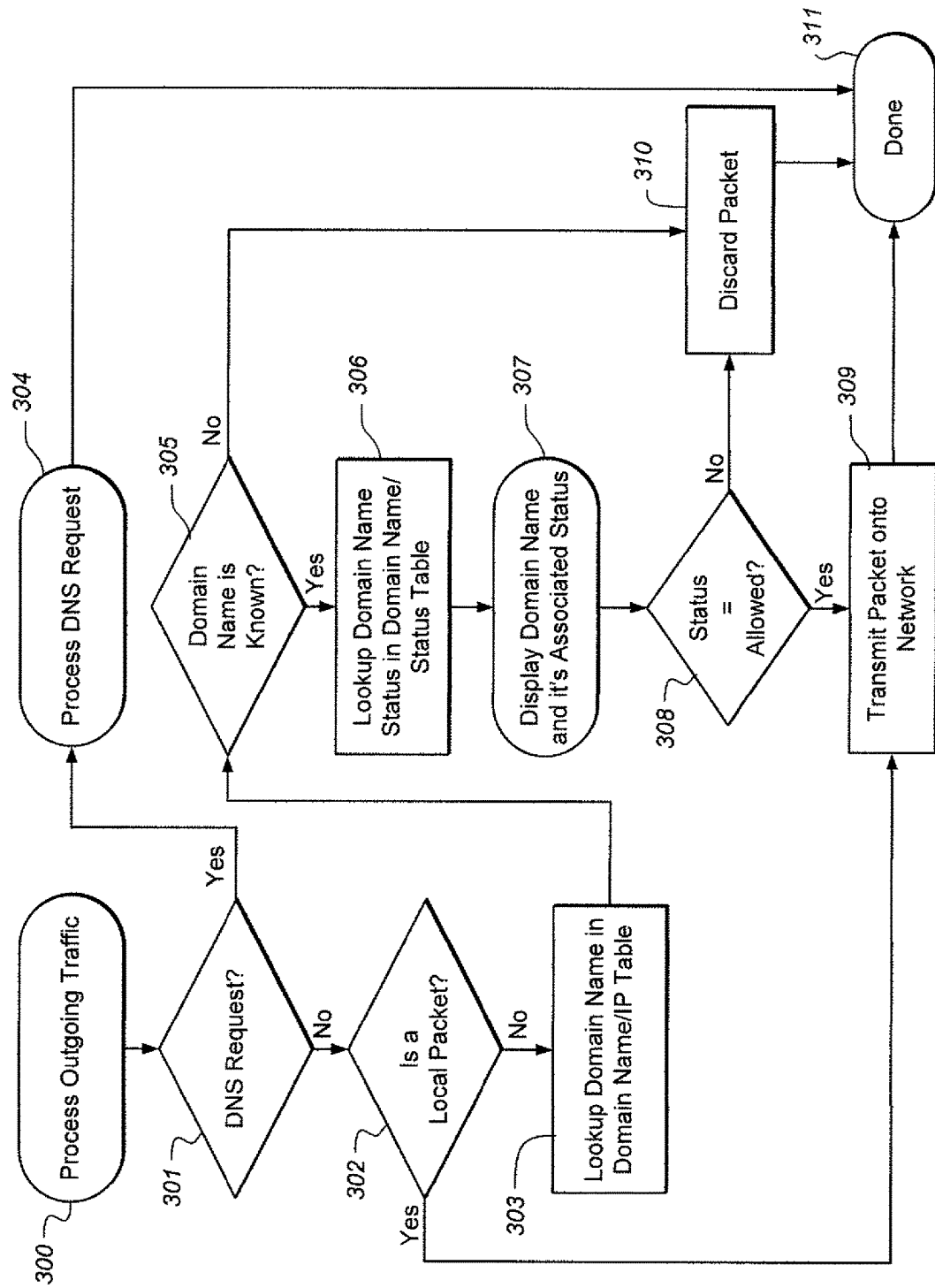
FIG. 3 is a flowchart view of an outgoing traffic processing operation, according to an embodiment of this disclosure.

FIG. 3 illustrates how outgoing traffic is processed in this particular embodiment 300. First, the embodiment determines whether the outgoing traffic is a DNS request or not

301. If it is a communication data packet that includes a DNS request, then the DNS request is forwarded to a separate process 304 and the current process exits 311. If it is not a DNS request, this embodiment then checks to see if it is a local data packet 302. If it is a local data packet 302 then the packet is transmitted onto the network 309 and the process exits 311. If it is neither a DNS packet 301 nor a local packet 302 then it is a remote packet. In this case, the embodiment uses the destination IP address to obtain the associated domain name using the Domain Name/IP table (traffic requester table) 303.

Note: The embodiment illustrated in FIGS. 1-9 may maintain two substantially real-time tables: Domain Name/IP table (also referred to as a traffic requester table) and Domain Name/Status table (also referred to as a status table). The Domain Name/IP table may keep track of all Domain Name/IP pairs listed in DNS Reply Packets. The Domain Name/Status table may keep track of the current status of each domain name (i.e. allowed or blocked). Status may be controlled dynamically by ongoing, substantially real-time user input. While the illustrated embodiment employs the use of tables, there are numerous data structures well-known in the art that can be used to store and retrieve the IP-Address(es) and the status associated with each Domain Name (examples include, but are not limited, to binary trees, database entries, sorted and unsorted arrays, linked lists, etc.). Such data structures can be used in conjunction with or in lieu of tables, either in part or in whole.

If no domain name is known for the destination IP Address 305 the outgoing packet is discarded 310 and the process exits 311. If the domain name is known 305 then the status of the domain name is obtained from the Domain Name/Status table 306. The domain name and its associated status are then displayed to the user 307. This authentication of a communication data packet is performed via a DNS authentication process of a firewall security platform.

If the status of the outgoing packet is "allowed" 308 then the packet is transmitted onto the network 309 and the process exits 311. If the status of the outgoing packet is not "allowed" 308 then the packet is blocked and/or discarded 311 and the process exits 311. (Notice that the Traffic Requester is externally displayed even when the internal packet gets discarded.) The validation of a communication data packet is performed via a domain name validation process of the firewall security platform.

Figure 4:
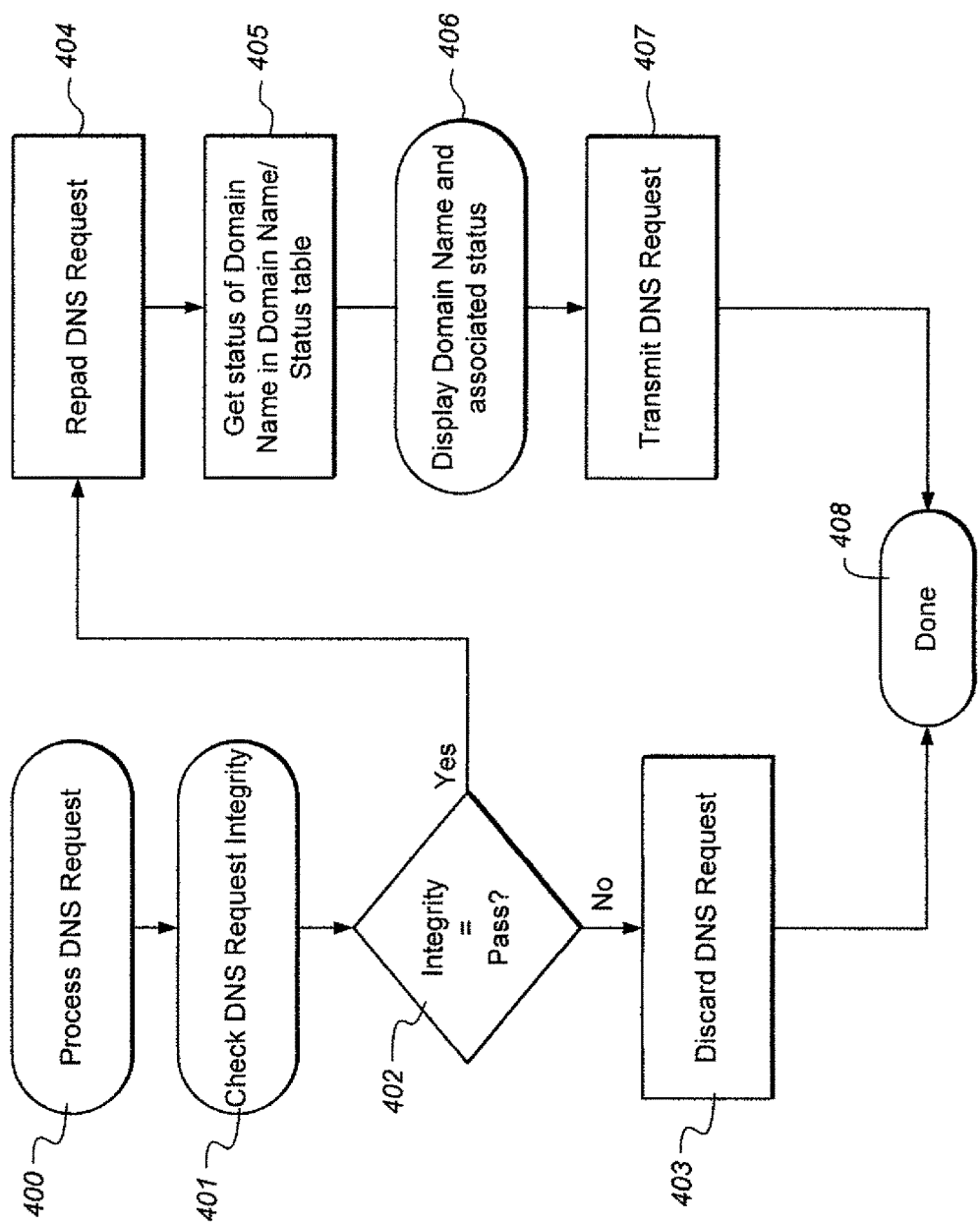
FIG. 4 is a flowchart view of a DNS request processing operation, according to an embodiment of this disclosure.

FIG. 4 illustrates how the DNS Request may be processed in one embodiment 400. First, the process checks the integrity of the DNS Request 401. If the integrity test does not pass 402 then the DNS Request is discarded 403 and the process exits 408. If the integrity test does pass 402 then the padded area of the DNS Request is overwritten (i.e. "repadded") 404. (This step prevents hackers from using the padded area of DNS packets to leak sensitive information off the user's computer.)

Next, the status of the domain name embedded within the DNS Request is obtained from the Domain Name/Status table 405. The Domain Name and its associated status are displayed 406. (Notice that the domain name displayed is the one embedded within the DNS packet [not a domain name associated with either the Destination IP Address or Source IP Address of the packet itself]. Thus, domain names from DNS packets are derived differently than domain names of non-DNS packets; yet all the domain names may be grouped together creating the Traffic Requester class regardless of their origin. This is one aspect of the novel Traffic Requester Paradigm.)

Regardless of status (e.g. "blocked" or "allowed"), the DNS request is transmitted to the DNS server 407 so that the IP Addresses associated with the domain name can be received and recorded in the Domain Name/IP table (traffic requester table). (Notice that "blocked" DNS Packets are still forwarded onto the network; whereas "blocked" Remote Packets are discarded.) The process then exits 408. Alternatively, DNS Requests can also be vetted against a list of approved DNS Servers and blocked if a request is made by a server not in the list.

Figure 5:
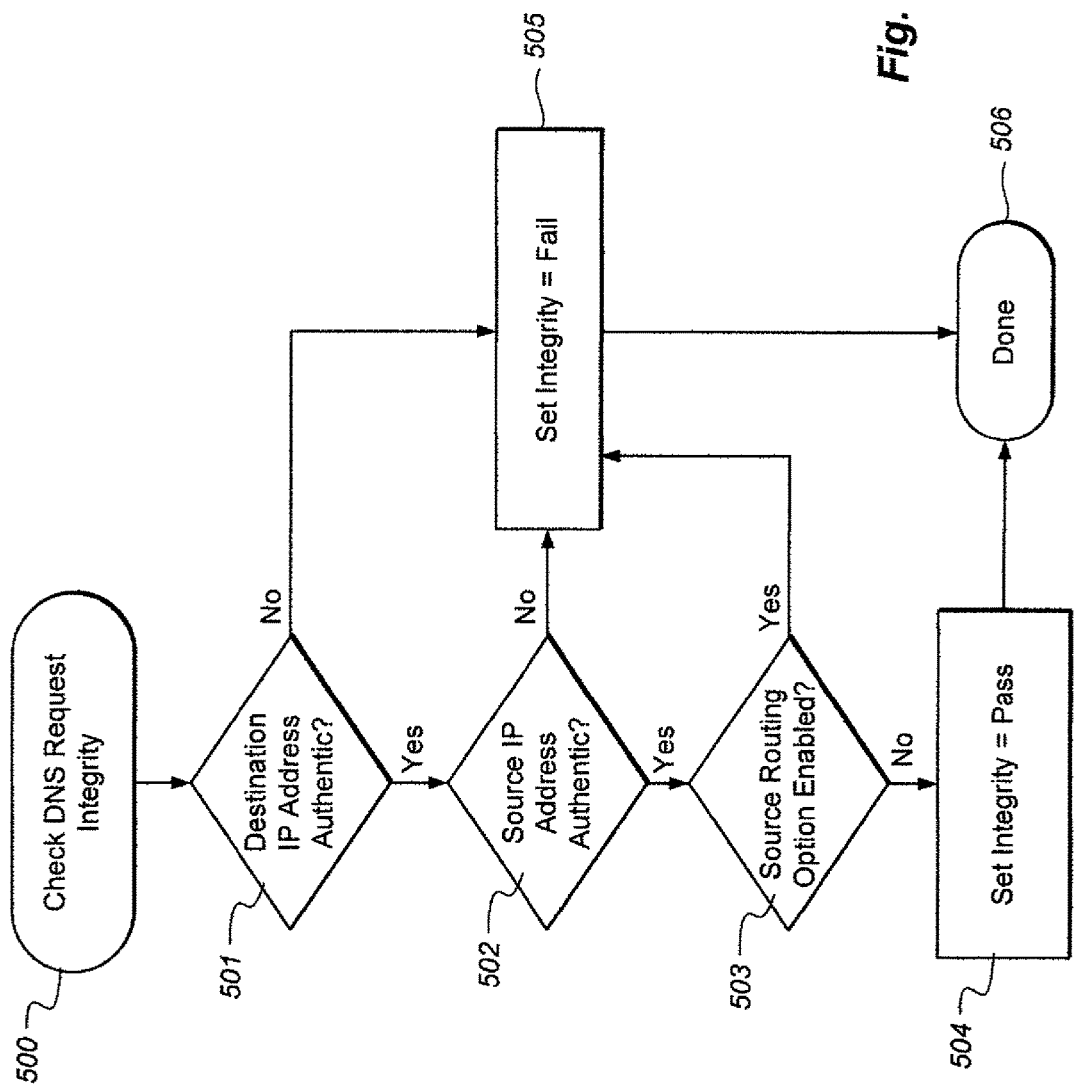
FIG. 5 is a flowchart view of a DNS request integrity processing operation, according to an embodiment of this disclosure.

FIG. 5 illustrates the DNS Request integrity test implemented in this particular embodiment. 500. First, the Destination IP Address is compared to the IP Addresses of all known DNS Servers 501. (Known DNS Servers can either be manually entered in at setup, or be obtained from the operating system, or be obtained from any other trusted source. All such methods are well-known in the art.) If the Destination IP Address does not match any known DNS Servers 501 then the integrity is set to "Fail" 505 and the subprocess exits 506. (Hackers sometimes stuff information into various areas of DNS packets and then use their own server IP addresses as the Destination IP Address. In this manner, sensitive user information hidden within DNS Request packets is directly forwarded to the hacker's computer. This DNS request integrity check 501 may prevent a hacker from executing such an attack.)

If the Destination IP Address matches a known DNS Server 501 then the Source IP Address is checked to see if it matches the known IP Address of the client PC 502. (The known IP Address of the client PC can be manually entered in at startup, or be obtained from the Operating System, or be obtained from any other trusted source. All such methods are well known in the art.) If the Source IP Address does not match any of the known IP Addresses for the client PC 502 then the integrity is set to "Fail" 505 and the subprocess exits 506. (This check prevents what is known as a "relay" hacking attack. In a relay attack, private information is stuffed into the packet using an authentic Destination IP Address for the DNS Server; however, the Source IP Address used is that of the hacker's computer. When most DNS Servers craft their DNS replies, they often copy the same padded area they received in the DNS requests. Savvy hackers make use of this. By sending data packets to a valid DNS Server, most firewalls allow the traffic to pass, and the firewall log entries only show that packets were sent to a valid DNS Server. However, since the Source address of the DNS Request is the hacker's computer, the DNS Server copies the user's sensitive information when it creates its DNS reply, and then the DNS Server sends the data-leak containing DNS Reply directly to the hacker's computer [since the DNS Server believed the DNS request came from the hacker's computer]. The DNS Server thus "relays" the sensitive information to the hacker's computer. Checking for authentic source IP Addresses 502 can prevent such "relay" attacks from occurring.)

If the Destination IP Address is authentic 501 and the Source IP Address is authentic as well 502, and thus valid, then this particular embodiment checks to see if the Source Routing option has been enabled on the packet 503. This check may be performed via a packet modifier process. If Source Routing is enabled 503 then the integrity is set to "Fail" 505 and the subprocess terminates 506. (Hackers often use source routing to siphon sensitive information off of client PC's. Source Routing allows a hacker to specify an IP Address through which the data packet must pass on its way to the Destination Address. Hackers can use Source Routing to force the internet routers to deliver data-leak packets directly to their computers before these packets ever arrive at the destination specified by the Destination IP Address. Discarding Source Routing Packets 503, 504 can prevent this type of attack.) It should be noted that some alternative embodiments of this present invention can include a source routing check for substantially all outbound traffic, in which case either the source routing option is stripped from the packet or the packet is discarded altogether as not being authenticable. Stripping of source routing data may be performed via the packet modifier process. The previously blocked communication data packet with the source routing data removed may now be a substantially secured communication data packet, which can be authenticable and thus not blocked.

If the Destination IP Address is authentic 501 then the packet is destined for an authentic DNS Server. If there is no Source Routing enabled on the packet 503 then the DNS request will travel straight from the user's computer to the DNS Server without visiting any other computers en route. And if the Source IP Address is authentic 502 then the DNS sends its reply directly back to the user's computer. Thus, when all three of these conditions are met, there is not any way for a hacker to use DNS-based packets for leaking sensitive information. Therefore, this particular embodiment sets the integrity to "Pass" when all three of these conditions have been met 504. Then the process exits 506.

The illustrated embodiment initially implements a "Deny All Approach" for all Remote Data Packets. Thus, all internet-bound packets are blocked—with the sole exception of DNS packets. Therefore, by implementing strict integrity checks for all DNS packets, the initial state of this particular embodiment has achieved maximum possible security (at least in terms of internet-based cybersecurity). It is then up to the user to purposefully allow any other traffic above and beyond this.

Note: Various embodiments will implement the Traffic Requester Paradigm based upon the needs of the user. While the illustrated embodiment is one implementation to protect against internet-based hackers, a different embodiment may be chosen for users in a corporate environment in which multiple users share a local network. Such embodiments may choose to replace the Local Traffic class with an IP Exception class instead (as is discussed further in this disclosure). Other alternatives for corporate environments are discussed further in this disclosure.

Figure 6:
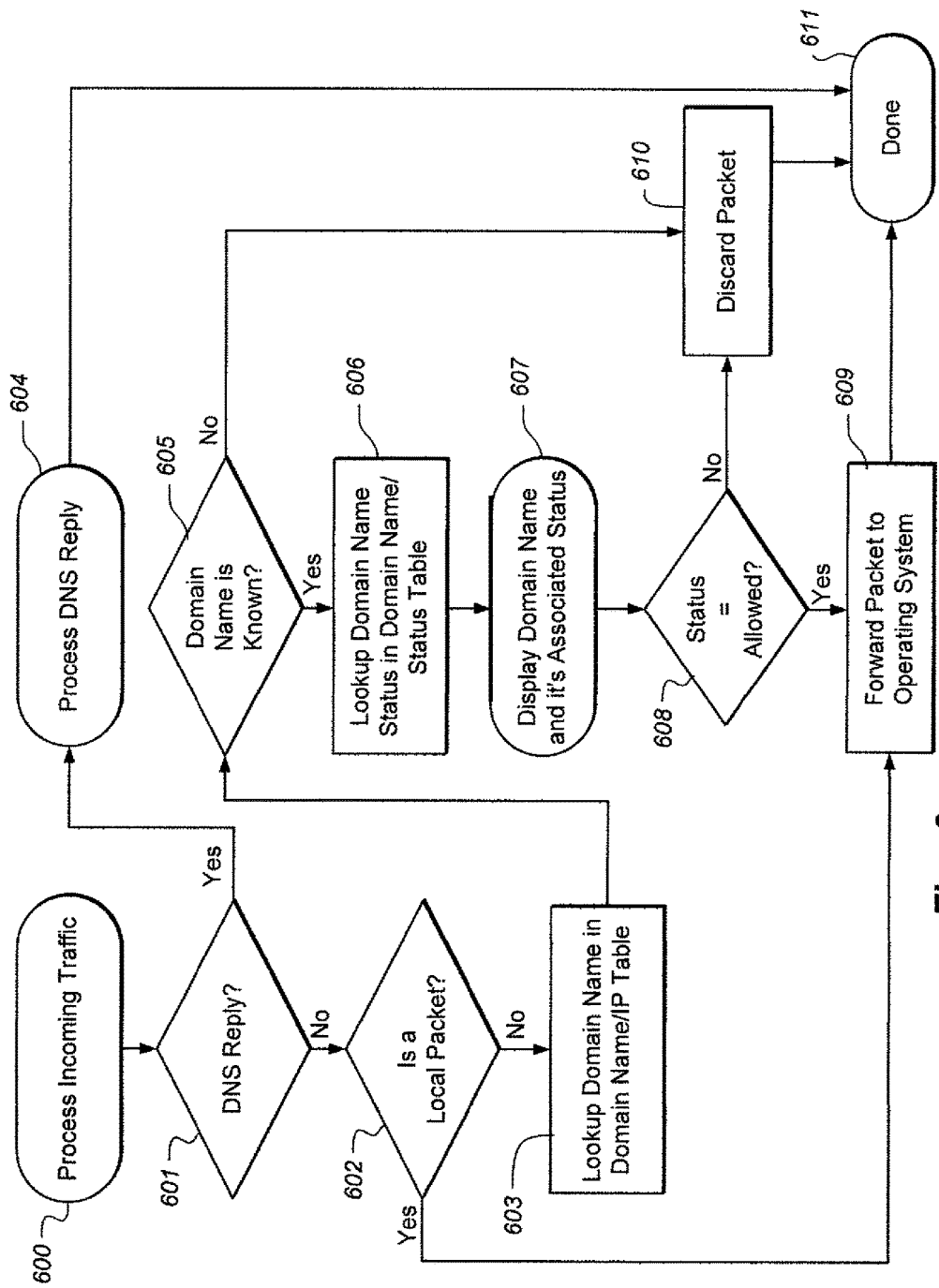
FIG. 6 is a flowchart view of a processing operation of incoming traffic, according to an embodiment of this disclosure.

FIG. 6 shows how incoming traffic is processed in the illustrated embodiment 600. If the incoming data packet is a DNS Reply 601 then the DNS Reply is forwarded to a separate process 604 and then the current process exits 611. This process is performed via a domain name reply integrity process. If the data packet is not a DNS Reply 601 then the process checks to see if it is a local packet 602. If it is a local packet 602 then the packet is forwarded to the Operating System 609 and then the process exits 611. If the packet is neither a DNS packet 601 nor a local packet 602, then it is a remote packet. Therefore, the process uses the Source IP Address to obtain the associated domain name using the Domain Name/IP table (traffic requester table) 603. If the domain name is not known 605 then the packet is discarded 610 and the process exits 611. If the domain name is known 605 then the status of the domain name is obtained from the Domain Name/Status table 606. The domain name and its associated status is then displayed 607.

If the status of the displayed domain name is not "allowed" 608 then the packet is discarded 610 and the process exits 611. If the status of the displayed domain number is "allowed" 608 then the packet is forwarded to the Operating System 609 and then the process exits 611.

Figure 7:
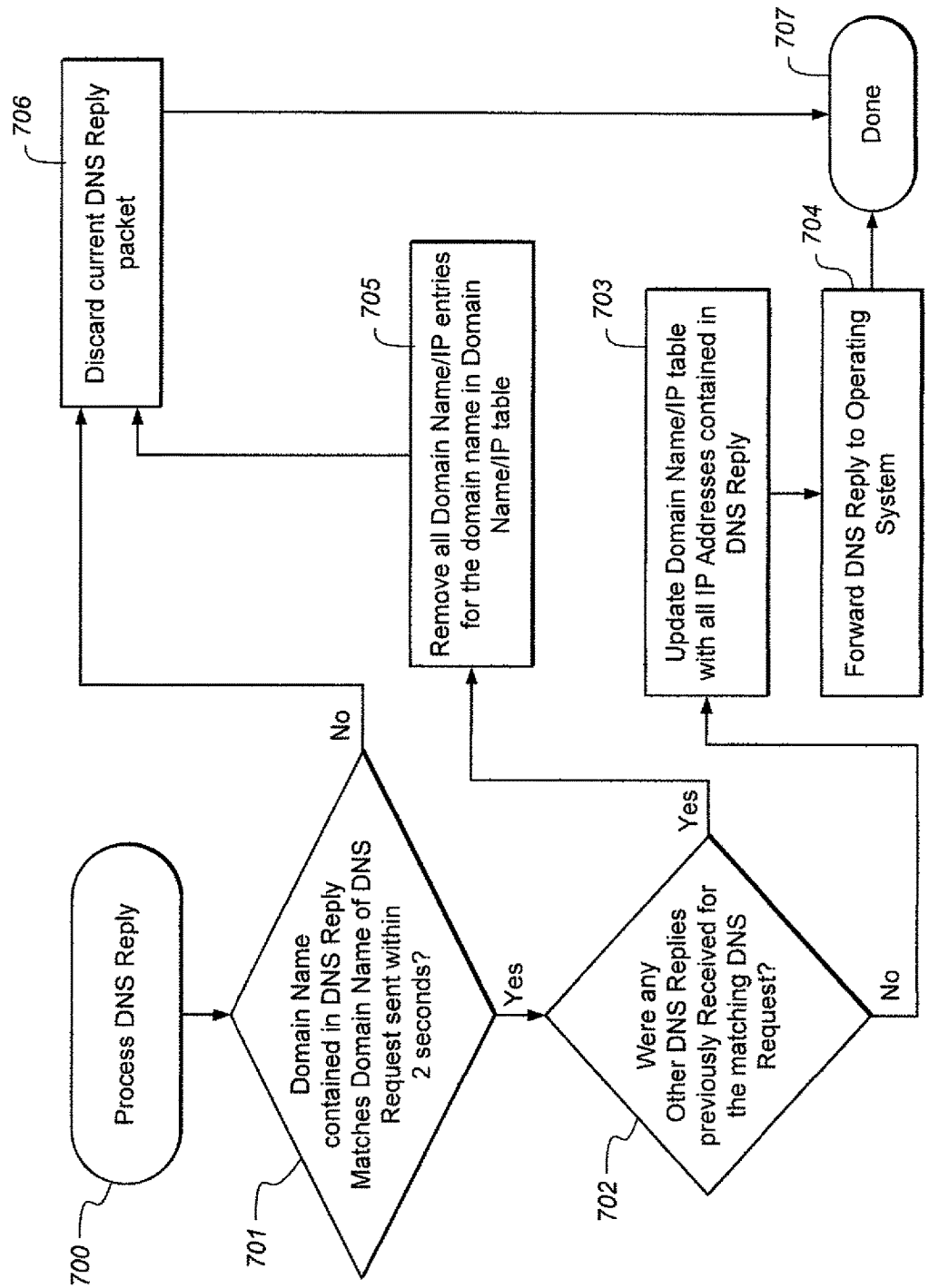
FIG. 7 is a flowchart view of a DNS reply processing operation, according to an embodiment of this disclosure.

FIG. 7 illustrates how DNS Replies are processed in this particular embodiment 700. The process checks to see if the domain name embedded in the DNS Reply matches the domain name embedded in any DNS Request made within a window, for example, the last two seconds 701. (This prevents a hacker from creating his own DNS Reply and then sending it to the user's computer. For example, if a hacker knows that a user often visits www.apple.com then the hacker can create his own DNS reply packet which says that www.apple.com is located at the hacker's IP Address. Then, when the user enters www.apple.com into his browser, all his Apple-bound traffic will go to the hacker's computer. The hacker can then attach sensitive user information to Apple-bound traffic, having the sensitive information delivered directly to his computer. Moreover, by sitting the in the middle of the user's Apple traffic, the hacker can both send and receive packets—allowing the hacker to use this communication to take total control over the user's computer. Ensuring that DNS Replies match previously sent DNS Requests 701 is one of the checks necessary to prevent this type of attack. The other check required is 702 discussed below.)

If the domain name in the DNS Reply does not match any domain names in recently sent DNS Requests 701 then the DNS Reply is discarded 706 and the process exits 707. If the domain name does match 701 then the process checks to see if multiple DNS Replies have been received for the matching DNS Request 702. If multiple DNS Replies have been received for the DNS Request then the DNS/IP Pairs of the previously matched DNS Replies may be removed from Domain Name/IP table (traffic requester table) 705; the current DNS Reply is discarded 706 and then then process terminates 707. (Check 701 looks for hacker-crafted DNS Replies which were sent without any DNS Request being initiated by the user. Check 702 looks for hacker-crafted DNS replies which were created by the hacker in direct response to a user-transmitted DNS request. Check 702 protects against "man-in-the-middle attacks." In "man-in-the-middle attacks," hackers send their own DNS Reply in response to the user's DNS Request. The user's computer will therefore receive IP Addresses from both the DNS Server and from the hacker as well. If his computer selects the hacker-provided IP Address then the hacker has unfettered access to the user's computer. By removing all Domain Name/IP Pairs when multiple DNS Replies are detected, the user is highly protected from this fairly popular hacking technique.)

If the domain name in the DNS reply matches the domain name of a recently sent DNS request 701 and there is only one DNS reply received for the DNS request 702 then the DNS Reply is considered authentic (in this particular embodiment). Therefore, the process updates the Domain Name/IP table (traffic requester table) with the received IP Address(es) for the embedded domain name 703. Then the DNS Reply is forwarded to the Operating System 704 and then the process exits.

Before discussing user input (FIG. 8), it is perhaps more helpful to discuss what the user may see on the display. FIGS. 9-13 illustrate different displays used by various embodiments, which may provide feedback to a user.

In FIG. 9, which provides feedback regarding allowed and blocked domains, allowed domains may be displayed in regular font and blocked domains may be displayed in bold. Hence, in FIG. 9, the following two domains are currently "allowed": www.apple.com and images.apple.com; whereas the following domain is currently "blocked": metrics.apple.com.

There are many alternatives for representing the identity and/or state of each domain. For example, color can be used. (As but one example: Green can be used for domains which are allowed and black can be used for domains which are blocked.) Another alternative would be to change the background based on status. Yet another alternative would be to annotate which domains are "allowed" and which domains are "blocked." Any manner of presentation designating the status of a displayed Traffic Requester group, or one or more members of the Traffic Requester group, falls within the spirit and scope of this present disclosure. (A Traffic Requester group includes one or more domain names as members derived from the internal contents of at least one DNS packet, and one or more domain names associated with either the source IP Address or destination IP address of at least one non-DNS-based packet.)

In a two-state implementation (such as FIG. 9), a user can simply toggle the current state with a single click of the mouse (in a mouse-driven implementation), a single tap of the screen (in a touchscreen implementation), etc. Any manner of selecting one or more Traffic Requesters for the toggling of the current status of said Traffic Requesters falls within the spirit and scope of this present disclosure. Alternatively, if the domain name owner's name is used as the ID, then one owner could represent two or more domains. For example, "Google Inc." could represent traffic requests to "Google.com" and "Gstatic.com." The status of two or more domains could therefore be represented and controlled by a single owner name.

FIG. 10 illustrates an embodiment which implements "temporary unblocking." When browsing the Internet, a user might want to only temporarily allow access a new site. FIG. 10 illustrates one way to use the Traffic Requester Paradigm to accomplish this goal. In this illustration, feedback relating to the number of hours for which a site is "unblocked" is displayed to the right of the domain name. In this particular implementation, a "*" indicates permanent unblocking while a number indicates that access is only temporarily unblocked for the stated number of hours. In FIG. 10, the following domains are permanently unblocked (until the user specifies otherwise): www.apple.com and images.apple.com; however, the following domain will remain unblocked solely for the next three hours: metrics.apple.com.

One method of input for the FIG. 10 embodiment includes: long-click for permanent unblocking and one or more short-clicks for temporary unblocking. For example, if the user wants to permanently allow www.apple.com, he presses the mouse button until the "*" appears. If the user wants to only allow metrics.apple.com to communicate for three hours, he quickly presses the mouse button three times. Naturally, there are many other ways to differentiate between permanent and temporary unblocking. Any method of inputting and designating temporary unblocking for one or more displayed Traffic Requesters falls within the spirit and scope of this disclosure.

FIG. 11 illustrates one embodiment with feedback which annotates current/recent talkers. In this particular embodiment, current/recent talkers are annotated via "*". In this particular embodiment, any site with which the user's computer communicated within the last five seconds is annotated as a current/recent talker. Such an embodiment is useful for users who want to identify which internet sites are tracking them. Consider the following example: When a user types in "www.apple.com," the firewall will automatically display three Traffic Requesters: www.apple.com, images.apple.com, and metrics.apple.com. (Apple's current website tries to communicate with all three of these domains.) For illustration purposes, if the user toggles the status of all three domains to "Allow," and if the user moves to another website such as www.mail.com (Mail.com's website currently tries to communicate with all the other domains displayed in FIG. 11.), while using mail.com, the user notices that metrics.apple.com starts talking. (The "*" annotation alerts the user to this.) Now the user is aware that metrics.apple.com is tracking his behavior—even after he has left the Apple website. If the user does not like having his behavior tracked by Apple, he can simply click on metrics.apple.com to put a permanent end to Apple's tracking.

Naturally there are many ways to designated current and/or recent talkers (i.e. sites with which the computer has recently communicated with). Also, there are many different ways to determine whether a site qualifies as a current and/or recent talker. Any method of calculation of and any method of designating current/recent talkers falls within the disclosed Traffic Requester Paradigm—provided such calculations and designations are for one or more Traffic Requester groups.

One feature not readily apparent in FIG. 11 is the notion that "blocked" sites can also be "current talkers." This is illustrated by the "b.scorecardresearch.com" entry. Notice that this entry is bolded (hence the site is blocked), yet it is also annotated as a "current talker" as well (it is annotated with "***"). "Blocked" "current talkers" occur when a DNS Request is sent for a currently blocked site. Hence, the embodiment illustrated in FIG. 11 communicates the following to the user: b.scorecardresearch is currently trying to talk, but is being blocked from doing so.

The display of "blocked" "current talkers" allows users to easily correct any mistakes that they may have made. For example, www.mail.com can only function properly if the user's computer also has access to i2.mail.com. However, most users will not know this, and therefore, some might not toggle i2.mail.com to "Allow." Mail.com will be unoperational. However, the user will see that i2.mail.com (a currently "blocked" Traffic Requester) is trying to communicate (i.e. it is a "current talker"). The user can then toggle the status of i2.mail.com to "Allow" with a click of the mouse, in which case the mail.com site will now function perfectly.

The ability to instantly and easily correct any mistakes is paramount to a successful firewall implementation. The Traffic Requester Paradigm displays exactly the right information that the user needs to correct any mistakes at just the right time. Therefore, a user will likely be very relaxed in toggling the status of sites since he or she knows that any mistake can be easily undone in a single click. The embodiment illustrated in FIG. 11 is but one embodiment that provides this capability.

FIG. 12 illustrates an embodiment with feedback which annotates repeat talkers. A repeat talker is any site that goes silent for a given period of time and then begins to communicate afresh. In the particular embodiment in FIG. 12, the length of the arrow is based on the number of times that the site has gone silent and then begun communicating again. In FIG. 12, metrics.apple.com has come back online three times since the user left the Apple website (">" for the first time it came back online, "->" for the second time it came back online, and "-->" as illustrated to designate the third time it came back online). Annotating "repeat talkers" is yet another method for quickly identifying both tracking and malicious sites. Any method of annotating repeat talkers falls within the spirit and scope of this present disclosure—provided that the annotation of repeat talkers is being applied to one or more Traffic Requester groups.

FIG. 13 illustrates an embodiment which annotates which domains are related to each other. In this embodiment, a space may appear on the display each time the user's computer is silent for a given period of time. In FIG. 13, the user first accessed Apple's website which caused the following three Traffic Requesters to spring into action: www.apple.com, images.apple.com, and metrics.apple.com. While visiting Apple's site, the user's computer was silent for a moment. During this time, the firewall added a space on the display. Then when the user visited another site (www.mail.com in FIG. 13) all the Traffic Requesters are now conveniently grouped together. The grouping of Traffic Requesters based on computer silence allows a user to instantly recognize which domains belong to Apple and which domains belong to the mail service. For certain types of users, this information can be helpful. Any visual grouping of Traffic Requesters falls within the spirit and scope of this disclosure.

FIGS. 9-13 illustrate a variety of displays. For each embodiment, the type of information displayed will depend on needs of the target audience. Within the Traffic Requester Paradigm, the following may be optionally displayed (in addition to domain name and current status): temporary unblocking (optionally also with the amount of time remaining displayed); designation of current and/or recent talkers; designation of repeat talkers, grouping of domain names based on either silence, continuance of communication, or perhaps even based on the website content itself. The use of none, one, or more of these options within the Traffic Requester Paradigm falls within the spirit and scope of this present disclosure.

Figure 8:
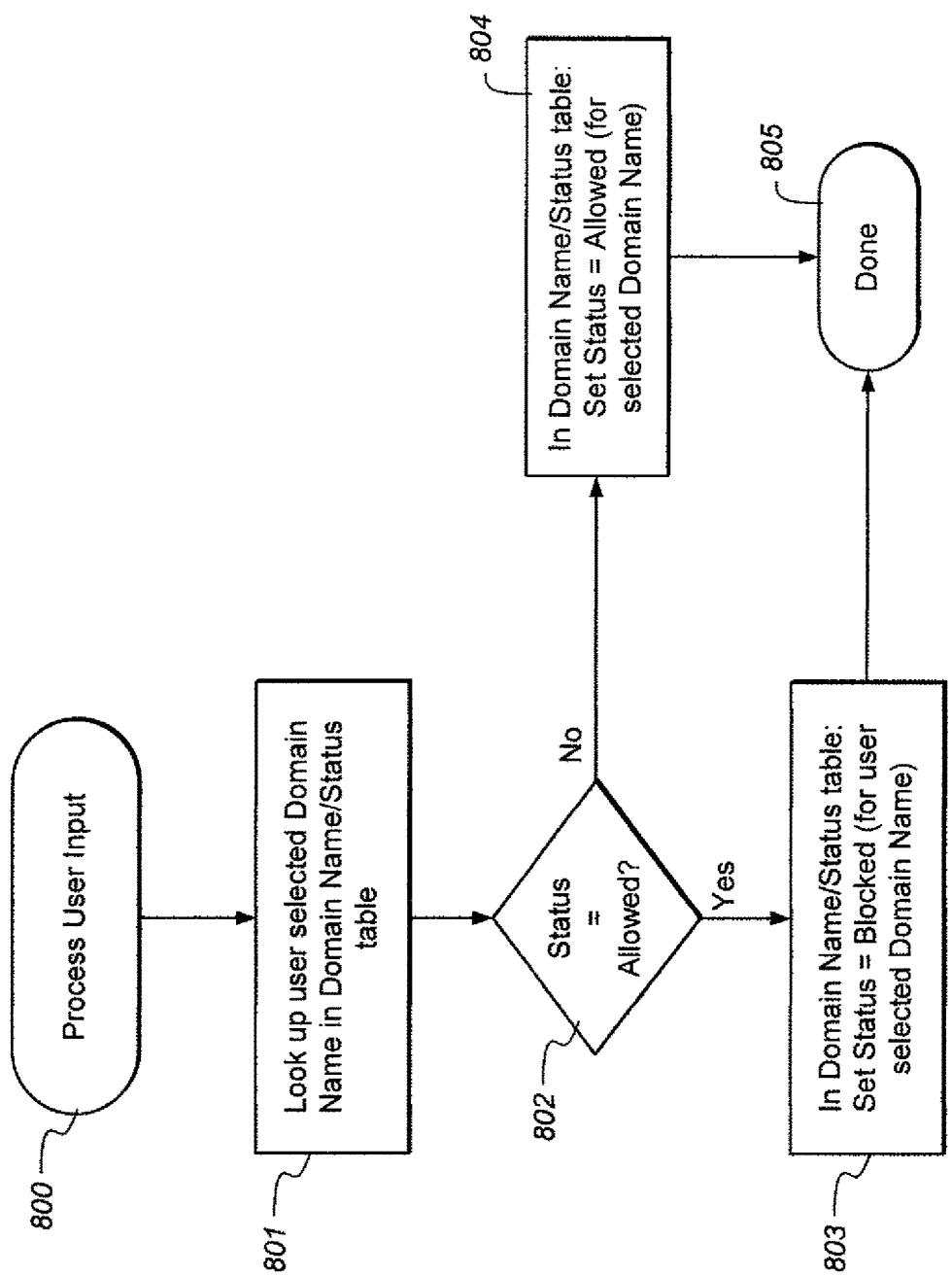
FIG. 8 is a flowchart view of a user input processing operation, according to an embodiment of this disclosure.

With the display in mind, the processing of user input is more readily understandable. FIG. 8 illustrates one embodiment's implementation of processing user input 800. In this particular embodiment, one domain is selected by a user at a time. (Alternatively, multiple domains can be simultaneously selected in other embodiments.) The status of the user-selected domain name is obtained from the Domain Name/Status table 801. If the domain name has an entry and that entry is "Allowed" 802 then the Domain Name/Status table is updated by setting the current status to "Blocked" 803 and the process exits 805. If the status of the user-selected domain name is not "Allowed" 802 then the Domain Name/Status table is updated by setting the current status to "Allowed" 804 and then the process exits 805. This operation may be performed via an authorization platform, which may provide the user with a decision whether to allow or deny communication of a communication data packet on the network, for example, for a domain name. Communication data packets that are denied by the decision may be discarded. Communication data packets that are allowed by the decision may be communicated via the network.

An embodiment encompassing a best mode of the invention will now be discussed. This embodiment includes a firewall security platform for enhancing security of a network. The firewall security platform includes at least one interface to communicate the identity and current status of one or more traffic requesters. Communication data packets associated with the one or more traffic requesters are allowed for communication via the network or denied and blocked by the firewall security platform based on the current status of each of the one or more traffic requesters. The firewall security platform also includes at least one device for receiving instructions from a user. The user's instructions include making a selection. The selection includes members that include at least one of the one or more traffic requesters. The current status of each member of the selection is altered in response to the making of the selection.

FIGS. 1-9 illustrate one full embodiment of the Traffic Requester Paradigm. FIGS. 10-13 illustrate various optional displays for providing feedback to a user.

Alternative embodiments exist both for the internal processing of data packets as well as the external display of one or more Traffic Requester groups.

For example, one embodiment implements an "IP Exception List." The "IP Exception List" allows the user's computer to communicate with the listed IP addresses—even if the IP addresses do not have any known domain names. Such a list could be useful in implementations in which a VPN is used. Such a list could also be useful in any computing environment in which multiple computers share access to the same local network. "IP Exception Lists" can be used in lieu of allowing all Local Data Packets, or they can be used in addition to this aspect.

It is also possible for embodiments to use none, one, or multiple of the packet verification processes discussed in the embodiment illustrated in FIGS. 1-9. A tremendous amount of security and control is afforded by the Traffic Requester Paradigm itself—with or without the additional packet verification and scrubbing processes.

Some embodiments can use whitelists and/or blacklists as a base, and then allow the user to dynamically control the traffic thereafter. A whitelist and/or blacklist may also be referred to as a DNS exception list. Such embodiments could optionally annotate Traffic Requesters that are included in the whitelist and/or blacklist. As but one example, all blacklisted Traffic Requesters could be annotated with "---". Thus, the user would see that the site is not only blocked, but it is on the blacklist as well. This would empower the user to make a highly informed choice on whether to unblock the Traffic Requester or not.

Well known in the art are lists which state the type of various websites (e.g. gun, religious, pornographic, etc.) Some embodiments could integrate these well-known lists with the novel Traffic Requester Paradigm. Such embodiments could annotate what type of site is associated with each Traffic Requester.

Some embodiments could display derivatives of the Traffic Requester domain names instead of the domain names themselves. For example, "Apple" could be displayed instead of, or in addition to, "www.apple.com"; "Apple-Images" could be displayed instead of, or in addition to, "images.apple.com." Such derivatives could be derived from lists. In another embodiment, such derivatives could be algorithmically derived from the domain names themselves. In still another embodiment, such derivatives could be derived from a combination of lists and algorithms.

Some embodiments may provide temporary blocking of Traffic Requesters, temporary unblocking of Traffic Requesters, neither, or both.

Some embodiments may default to progressive temporary unblocking. For example, the amount of time for temporary unblocking can be based on the number of times the Traffic Requester has been unblocked. (Perhaps the first unblocking last for only two hours; the next unblocking lasts for a day; the next unblocking lasts for a week; the next unblocking lasts for a month; etc. Any method of variable temporary unblocking (and/or variable temporary blocking) applied to one or more Traffic Requester groups falls with the spirit and scope of this present disclosure.

Conclusion, Ramification, Scope

To permanently end computer hacking, computer operators must be able to monitor and control all traffic going in and out of their computers. After all, when a user has total control over the traffic going in and out of his computer then the hacker has no control whatsoever. The Traffic Requester Display paradigm finally gives users substantially absolute control over all traffic going in and out of their computers.

The Traffic Requester Display Paradigm provides one-click management of communication to each member of the Traffic Requester group—making substantially total control over traffic simple and convenient while simultaneously achieving the maximum possible security: Firstly, the user sees the essentially bare minimum information necessary to make informed decisions (e.g. domain names and their associated status); secondly, the user is required to make the essentially bare minimum amount of effort to express whatever decision is made (e.g. a single mouse click to toggle the status or simply do nothing at all to allow the status to remain). It should be stressed that the user typically only sees information which is relevant to him (e.g. domain names such as "www.apple.com"). It should also be stressed that this paradigm allows for the Deny All Approach to finally be achievable in real-world use.

There are many non-obvious ramifications to the Traffic Requester Display Paradigm. For example, this paradigm provides for almost effortless correction of mistakes. Traditional firewalls are notoriously unforgiving when mistakes are made. Sometimes users even need to reinstall their entire operating system when a mistake is made (when the erroneously configured firewall is integrated into the Operating System itself). But the Traffic Requester Display Paradigm not only reduces mistake correction down to a single mouse click, but it also provides the user with the information necessary to correct the mistake at just the right time. The elegant presentation of information allows the user to almost effortless reverse decisions on the fly. This has tremendous ramifications on the usability and therefore ultimate effectiveness of this methodology.

The longstanding challenge has been to find a way to group and display traffic such that every data packet is accounted for without the user being overloaded with too much information. The other longstanding challenge has been to find a convenient mechanism to allow a user to immediately respond to information. The Traffic Requester Paradigm disclosed herein finally solves both challenges. By displaying the domain names (and/or the names of the domain names' owner) of the novel Traffic Requester group, every packet is accounted for in a manner that is easy and intuitive for the user. And, by having the user toggle the status with a single click of the mouse, virtually nothing could be simpler for the user.

Accordingly, the reader will see that the highest possible form of security (i.e. the "Deny-All Approach") can be fully achieved in a convenient, easy-to-use manner (contrary to the deeply ingrained presumption and "security fundamental" embraced by those ordinarily skilled in the art). A real-time traffic monitor based on the Traffic-Requester Paradigm is an elegant counterpoint to the longstanding belief in a supposed inverse relationship between convenience and security. Through tightly integrating this novel traffic monitoring methodology with a dynamic traffic control methodology, the gaping hole in PC cybersecurity is finally essentially closed via this easy-to-use, "Deny-All Approach" that is applicable to the unique characteristics of web-browser traffic.

Transparent Traffic Control Devices

The invention also provides network traffic control systems, devices (also called transparent traffic control ("TTC") devices herein), and methods for securing network-connected devices includes, for example, Internet-connected consumer devices (the latter also referred to herein as IoT devices) from hackers and other online security threats. Network-connected devices includes Internet-connected devices (including IoT devices) and devices connected to other types of networks such as a local area network (LAN), a wide area network (WAN), or a virtual private network (VPN). As mentioned elsewhere herein, the transparent traffic control device is sometimes referred to herein as a TTC device. The TTC device can be a computer, a server, or any other computing device capable of performing the Traffic Requester Name display and status control functions described herein. For example, in some embodiments, the TTC device can be a tablet computer, a mobile device such as a cellular phone or smart phone, a hardware firewall, a router, or a modem. In some embodiments, the TTC device can be a device that is used for other purposes, such as a home or office computer, while in other embodiments, the TTC device can be a device that is dedicated solely for use as a TTC device to perform the functions described herein.

IoT devices can include, without limitation, televisions, radios, stereos, home entertainment systems, cable boxes, satellite television boxes, speakers, printers, telephones, cellular telephones, cameras, GPS devices, home security cameras, motion detectors, home alarm systems and devices, thermostats, timers, light timers, light bulbs, sprinkler systems, sprinkler system timers, wall plug adapters, power outlets, power switches, scales (e.g., scales used for measuring human body weight or the weight of animals or objects), electronic fitness wristbands and other wearable fitness devices, remote health monitoring devices (e.g., remote heart rate monitors, remote blood pressure monitors, and remote blood sugar monitors), automobiles, appliances, and any other device having a connection to the Internet. The TTC devices and methods can also be used to secure more traditional Internet-connected devices including home computers, office computers, tablet computers, and smart phones.

One embodiment of a system of the invention can include at least one Internet-connected device, a transparent traffic control (TTC) device for receiving and either allowing or blocking at least one data packet destined for the at least one Internet-connected device, a network connection that communicatively connects the TTC device to the at least one Internet-connected device, and a communications network for transmitting the at least one data packet to and from the TTC device. The TTC device displays a traffic requester name and associated current status representing the Internet-connected device when the Internet-connected device attempts to communicate with the network. For example, the IoT device can have a current status of "allowed" or "blocked." IoT devices having an allowed current status can be permitted to send and/or receive data packets to and/or from the communications network. IoT devices having a blocked allowed current status would not be permitted to send and/or receive data packets to and/or from the communications network in this example.

The system can further include a searchable data structure that includes at least one recognized media access control (MAC) address. All MAC addresses that attempt to communicate with one of the IoT devices of the system can be stored as MAC address data in the searchable data structure. The searchable data structure can be a MAC group structure, an array, a binary tree, a linked list, a red-black tree, a table, or any other searchable data structure that is suitable for organizing data that includes the at least one MAC address. In an exemplary embodiment, the searchable data structure can be stored in storage media installed in the TTC device. In other embodiments, the searchable data structure can be stored elsewhere and accessed remotely by the TTC device via the communications network.

Each MAC address can be assigned to a TTC group ID (also referred to herein as a network traffic group ID) among a group of one or more TTC group IDs. Each of the one or more TTC group IDs can include at least one known MAC address. Some TTC group IDs may not include any MAC addresses until a MAC address is added by a user. The TTC device can be used to create one or more new TTC group IDs to which existing (and known) or new (and unknown) MAC addresses can be assigned. The TTC device can also include controls for allowing an existing and known MAC address to be reassigned to a different existing TTC group ID or to a new TTC group ID that must be created.

For each data packet received by the TTC device, the TTC device can perform a check to determine whether the MAC address associated with each such data packet is a MAC address that is known to the TTC device or a new and unknown MAC address. The TTC device performs the check by searching the searchable data structure for a record of the MAC address in the MAC address data stored therein. If the MAC address of the data packet received by the TTC device is known, the TTC device determines to which TTC group ID among the one or more TTC group IDs the MAC address is assigned based on MAC address data in the searchable data structure.

If the MAC address of the data packet received by the TTC device is new and unknown, the TTC device can allow the user to assign the new and unknown MAC address to an existing TTC group ID or to a new TTC group ID that must be created.

The system can also include a display monitor. The display monitor (also referred to herein as a display) can be a separate component of the system to which the TTC device is connected by a wired or a wireless connection, or the display monitor can be part of a unitary TTC device having an integrated display. The TTC device can be used to assign each TTC group ID a unique annotation that is viewable on the display monitor. A unique annotation can be assignable to the new TTC group ID. The unique annotation can indicate both the TTC group ID and a current status that visually indicates whether the at least one data packet from the at least one MAC address is allowed or blocked. The unique annotation can be a color code (e.g., a colored background, a colored font, or a colored border), an animation, an icon, a symbol, a word, or another device for visually indicating the current status of each TTC group ID. When color codes are used, any colors may be assigned the status of allowed and the status of blocked as long as the two colors indicating each current status differ in appearance from one another. With any unique annotations used by the system to indicate current status of a TTC group ID, the unique annotation used to indicate the allowed current status must be visually distinguishable from the unique annotation used to indicate the blocked current status. By default, data packets received from new and unknown MAC addresses can be blocked by the system.

The current status assigned to a TTC group ID can apply to all MAC addresses associated with that TTC group ID, and therefore, to all IoT devices associated with those MAC addresses The TTC device permits communication (i.e., transmission) of data packets, having a current status that is allowed, from an allowed MAC address assigned to an allowed TTC group ID having a unique annotation that indicates that its current status is allowed. The TTC device can block and deny communication of data packets from a blocked MAC address (i.e., one having a current status that is blocked) assigned to a blocked TTC group ID having a unique annotation that indicates that its current status is blocked.

If a data packet originates from a MAC address associated with a TTC group ID having a current status that is allowed, the TTC device will allow transmission of the data packet to the Internet-connected device to which it was destined. If the data packet originates from a MAC address associated with a TTC group ID having a current status that is blocked, then the data packet can be discarded and not transmitted to the Internet-connected device.

The system can also be used to set rules for allowing or blocking a process for which initiation is sought by a mouse click by a user by allowing or blocking the user's mouse click.

In one exemplary embodiment, the TTC device can include a device for receiving at least one data packet destined for an Internet-connected device, a device for either allowing or blocking the transmission of the at least one data packet based on a MAC address associated with the at least one data packet, and a searchable data structure for storing MAC address data related to MAC addresses that the TTC device recognizes as known. Each MAC address is associated in the searchable data structure with a TTC group ID among a group of one or more TTC group IDs. The TTC device can further include an interface for assigning each MAC address to one TTC group ID among the group of one or more TTC group IDs and for designating each TTC group ID of the group of one or more TTC group IDs as having an allow status or a block status. The device for either allowing or blocking the transmission of the at least one data packet allows the transmission of the at least one data packet if the MAC address of the at least one data packet is associated with a TTC group ID assigned the allow status and blocks the transmission of the at least one data packet if the MAC address of the at least one data packet is associated with a TTC group ID assigned the block status.

The TTC device controls the transmission of a data packet being transmitted by the Internet-connected device to another device connected to a communications network to which the TTC device is connected. The TTC device can be communicatively connected to the Internet-connected device by a network connection capable of transmitting data packets to or from the TTC device. The network connection can be a wired connection or a wireless connection. The TTC device can be communicatively connected to a communications network for transmitting the at least one data packet to and from the TTC device to another device connected to the communications network, for example, to a computer or a server on the network. For convenience, the communications network is referred to herein as the Internet, however, in some embodiments, the communications network can be a different type of network, e.g., a local area network (LAN), a wide area network (WAN), or a virtual private network (VPN). Using known standard bridging protocols, MAC-based communications can occur across a LAN, WAN, or VPN. In some embodiments, the TTC device can include a separate or an integrated display monitor that allows the visual representation and display of the allow status and block status thereon.

The invention can also feature a transparent traffic control (TTC) system for securing an Internet-connected device from an online security threat. The system can include a TTC device that translates one or more remote IP addresses contained in one or more data packets that desire to enter or exit one or more network interface cards into one or more traffic requester names. The system can also include a display connected to the TTC device for dynamically displaying one or more traffic requester names and their associated status at the time each of the one or more data packets attempts to enter or exit the one or more network interface cards. The TTC device can include an interface viewable on the display to allow a user to change the status of one or more of the one or more traffic requester names at the time each of the one or more data packets attempts to enter or exit the one or more network interface cards. Dynamic display of the one or more traffic requester names and their associated status can include the visual representation of the current status of each traffic requester name on the display as data packets from that traffic requester are intercepted by the TTC device. Such dynamic display permits a user to monitor network traffic in real-time and to take action as appropriate, for example, by assigning a current status of allowed or a current status of blocked to traffic requesters sending data packets to the TTC system. In one embodiment, the one or more traffic requester names can include at least one domain name. In another embodiment, the one or more traffic requester names can include at least one domain name owner's name. In other embodiments, the one or more traffic requester names can include both one or more domain names and one or more domain name owners' names. The system can further include a searchable data structure as described herein for storing data related to each traffic requester name and a TTC group ID to which each such traffic requested name is assigned along with each TTC group ID's current status.

The invention also features methods that can be used to secure an Internet-connected device from an online security threat. The method includes the step of installing a transparent traffic control (TTC) device so that the TTC device is communicatively connected to a communications network and also to a network connection that communicatively connects the TTC device to an Internet-connected device. In another step, the TTC device can be used to intercept a data packet transmitted to the Internet-connected device via the communications network from a media access control (MAC) address. In another step, the TTC device can perform a check to determine the MAC address of the data packet. Note that the Internet-connected device (includes an Internet-connected device that is an IoT device) talks to the TTC device in a manner in which its MAC address can be retrieved from the data packet. In another step, a searchable data structure for storing MAC address data related to MAC addresses that the TTC device recognizes as known can be searched to locate the MAC address of the intercepted data packet. Each MAC address is associated in the searchable data structure with a TTC group ID of a group of one or more TTC group IDs. In another step, if the MAC address is known being represented in a record in the MAC address data stored in the searchable data structure, the TTC device can forward (or communicate or transmit) the data packet to the Internet-connected device if the MAC address is assigned to one of the TTC group IDs having a current status that is allowed and discarding the data packet if the MAC address is assigned to one of the TTC group IDs having a current status that is blocked.

If the MAC address is new and unknown as determined by its absence from the MAC address data stored in the searchable data structure, the method can include the step of assigning the MAC address to a TTC group ID. The TTC group ID can be an existing TTC group ID or a new TTC group ID that is created by a user using the TTC device or system described herein.

In another step of the method, a unique annotation can be assigned to each TTC group ID. The unique annotation can be assigned to each TTC group ID using a status assignment process of the TTC device and system. In another step of the method, the unique annotation for each TTC group ID can be visually displayed, along with the current status for each TTC group ID, on an interface that is viewable on a display monitor connected to the TTC device.

Figure 14:
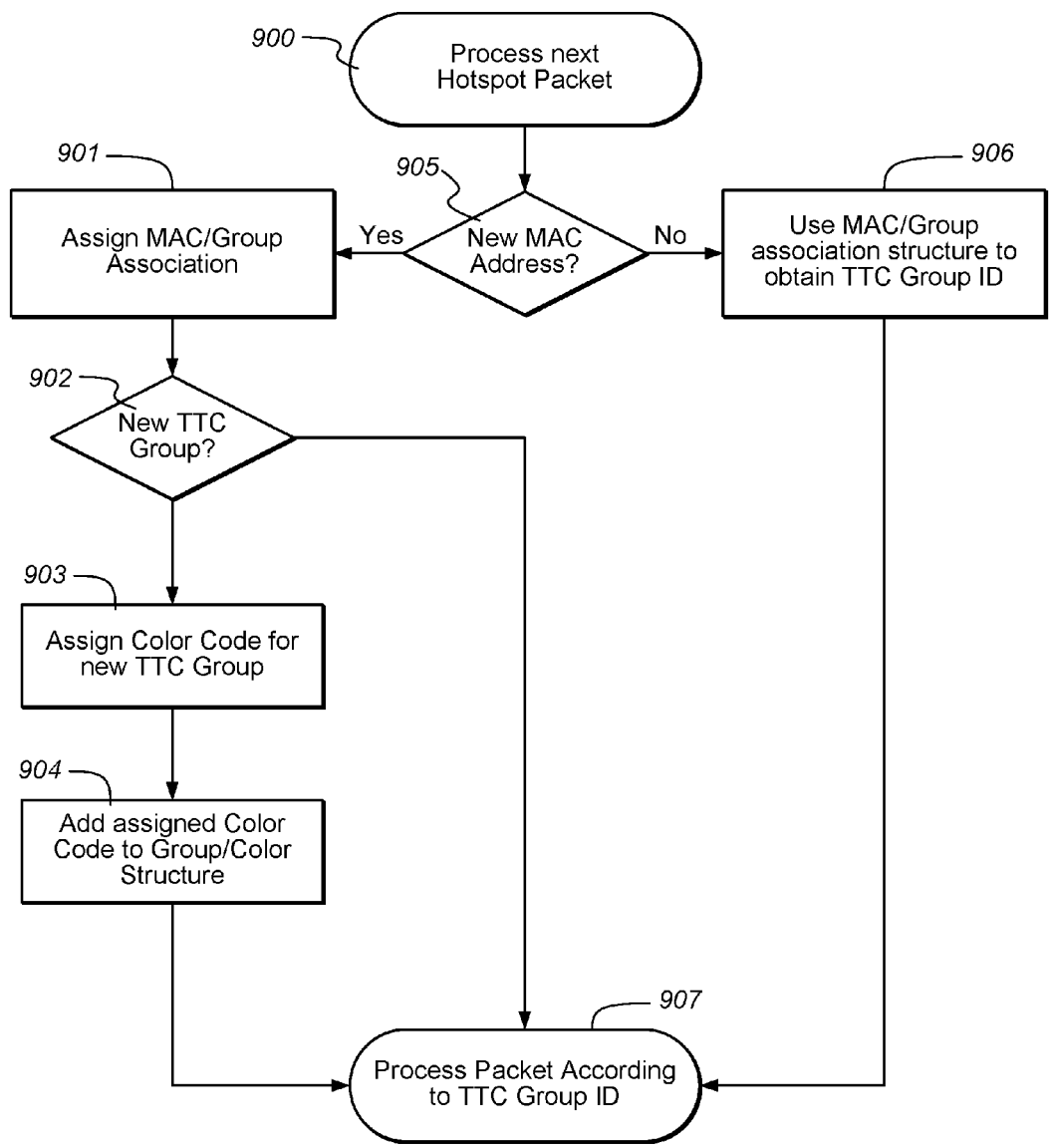
FIG. 14 is a flow chart diagram of a process of the method, device, and software in which data packets enter a TTC Device.
Figure 15:
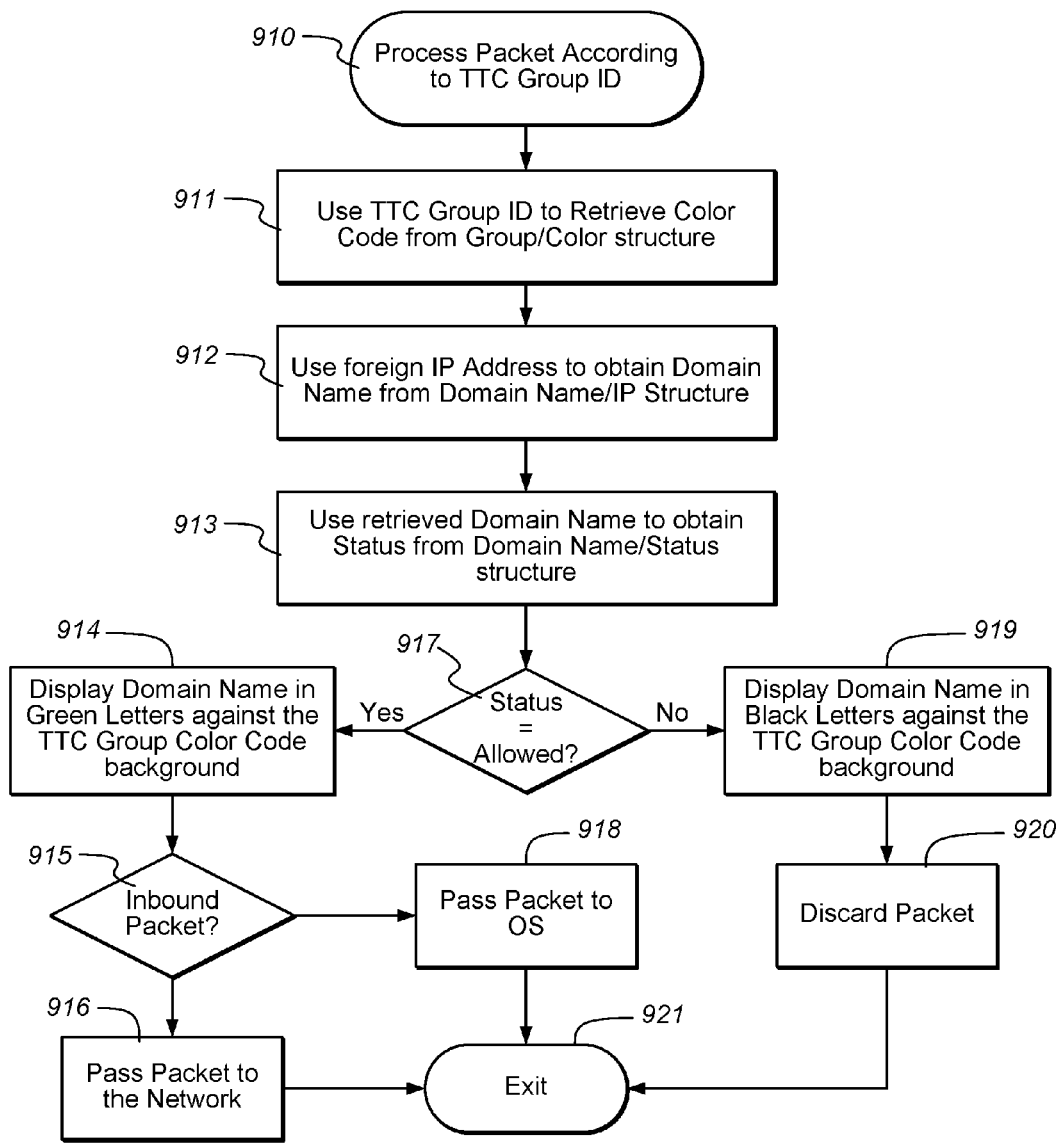
FIG. 15 is a continuation of the flow chart diagram of FIG. 14 that shows how data packets are processed according to a TTC Group ID.
Figure 16:
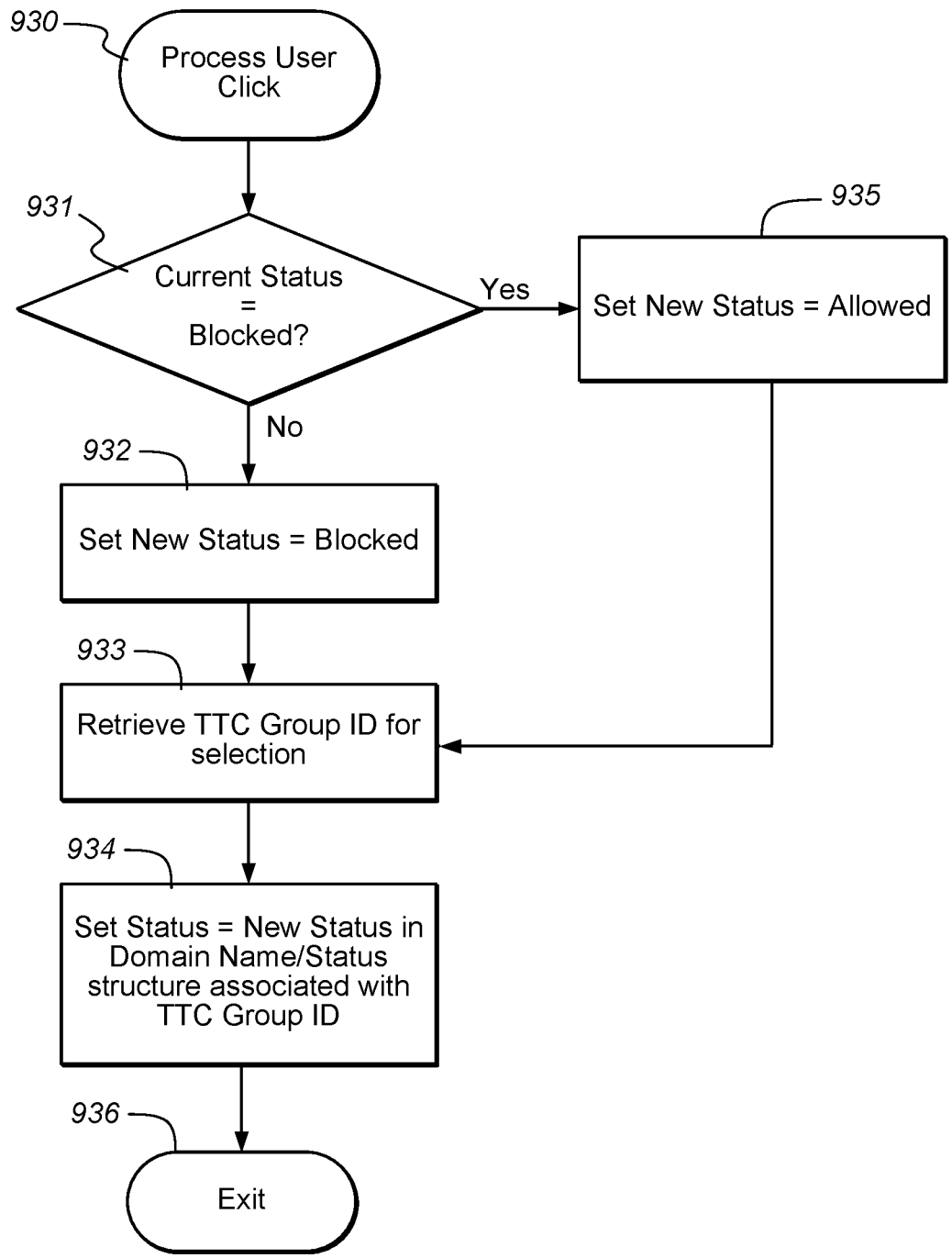
FIG. 16 is a flow chart diagram of another process of the method, device, and software in which a user's mouse clicks are processed by the TTC Device.

FIGS. 14-16 illustrate one embodiment of the systems and methods for securing IoT devices. These drawings illustrate one implementation of a block-all, color-coded, one-click embodiment.

In this particular embodiment, two sources of input exist: data packets entering the TTC device and user mouse clicks. FIGS. 14 and 15 illustrate this embodiment's processing of data packets (also referred to herein simply as "packet" in the singular and "packets" in the plural) entering the TTC device. FIG. 16 illustrates this embodiment's processing of user mouse clicks.

As shown in FIG. 14, once a new packet is received 900, the TTC Device, implementing the methods described herein using software and hardware, checks to see if the packet came from a new MAC Address 905. If not 905, then the TTC Device obtains the TTC Group ID from the MAC Address via the MAC/Group structure 906. The MAC/Group structure 906 is a searchable data structure. Alternative searchable data structures can include, without limitation, tables, arrays, binary trees, red-black trees, linked lists, and any other suitable searchable data structure. Once the TTC Group ID is retrieved 906, the TTC Device then processes the packet in accordance with a current status (i.e., an allowed status (or "allowed") or a blocked status (or "blocked")) that has been assigned to the retrieved Group ID 907.

If the packet does come from a new MAC Address 905, then the TTC Device prompts the user to assign the new MAC Address to a TTC Group 901. If the user chooses an existing TTC Group 902 then the TTC Device processes the packet according to the already existing TTC Group ID 907. However, if a new TTC Group ID has been chosen 902 then the user is prompted to select a Color Code for the new TTC Group 903. The newly chosen Color Code along with the new TTC Group ID are inserted into the Group/Color Code structure 904. The TTC Device then processes the packet in accordance with rules configured for the newly designated TTC Group ID 907.

FIG. 15 illustrates how the TTC Device of this particular embodiment processes packets in accordance with their respective TTC Group IDs 910. The TTC Group ID is used to retrieve the Color Code from the Group/Color Code structure 911. The packet's foreign IP address is used to obtain the Domain Name from the Domain Name/IP structure 912. (Note that creation and maintenance of the Domain Name/IP structure is fully described as set forth in U.S. Nonprovisional Patent Application Ser. No. 14/706,459 ("the '459 Application"), which is hereby incorporated herein in its entirety by this reference. The '459 Application describes a series of security checks to validate that each IP Address in the Domain Name/IP structure truly belongs to the named website. In other words, the devices and methods of the '459 Application protect against hackers' IP Addresses masquerading as the named websites instead.) The retrieved Domain Name is then used to obtain the Status from the Domain Name/Status structure 913. (Note that the creation and maintenance of Domain Name/Status structures is fully described in the '459 Application.)

If the Status does not equal "Allowed" 917, then the Domain Name is displayed in black letters against a background matching the color of the Color Code 919. The packet is then discarded 920 and the process regarding this particular packet exits 921. However, if the Status does equal "Allowed" 917 then the Domain Name is displayed in green letters against a background matching the color of the Color Code 914. Then, the TTC Device performs a check to determine if the packet is an inbound packet 915. If the packet is an inbound packet 915, then it is forwarded to the Operating System; otherwise 915, the packet is forwarded to the network 916. Then, the process regarding this particular packet exits 921.

FIG. 16 illustrates how this particular embodiment of the TTC Device processes user mouse clicks 930. This embodiment of the TTC Device checks to determine if the status is currently set to "Blocked" 931. If the status is currently set to "Blocked" 931, then the TTC Device sets New Status equal to "Allowed" 935; otherwise, the embodiment sets New Status equal to "Blocked" 932. In either case, the TTC Device then retrieves the TTC Group ID for the Domain Name selected by the user click 933. Then, the embodiment updates the Domain Name/Status structure associated with the retrieved TTC Group ID (such that the Status associated with the selected Domain Name equals New Status) 934. The user click process then exits 936.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A system for securing an Internet-connected device from an online security threat, the system comprising:
   at least one network-connected device;
   an article of manufacture comprising a network traffic control device comprising one or more devices for receiving and either allowing or blocking at least one data packet destined for the at least one network-connected device, the network traffic control device comprising:
      a processor and associated memory;
      at least one network interface card for receiving and transmitting the at least one data packet;
      a display monitor to communicate a name and a current status of one or more traffic requesters; and
      a user input device for receiving an instruction from a user;
      wherein the network traffic control device secures the at least one network-connected device when the network-connected device attempts to communicate with an Internet protocol (IP) address of another network-connected device;
   a network connection that communicatively connects the network traffic control device to the at least one network-connected device; and
   a communications network for transmitting the at least one data packet to and from the network traffic control device.

2. The system of claim 1, wherein the at least one network-connected device attempts to communicate with the IP address of at least one other network-connected device; and wherein the network traffic control device displays a traffic requester name and associated current status representing the at least one other device.

3. The system of claim 1, wherein the network traffic control device comprises a computer, a server, or any other suitable computing device.

4. The system of claim 1, wherein the network-connected device comprises a television, a radio, a stereo, a home entertainment system, a cable box, a satellite television box, a speaker, a printer, a home security camera, a wall plug adapter, a motion detector, a home alarm system or device, a thermostat, a timer, a light timer, a sprinkler system, a sprinkler system timer, a light bulb, a household appliance, or any other suitable device comprising a connection to the communications network.

5. The system of claim 1, wherein the memory of the network traffic control device comprises at least one recognized media access control (MAC) address.

6. The system of claim 5, wherein for each at least one data packet received by the network traffic control device, the network traffic control device performs a check to determine whether the at least one MAC address associated with each such at least one data packet is a MAC address that is known to the network traffic control device or a new and unknown MAC address, wherein the check is performed by searching the memory of the network traffic control device for the presence of the at least one MAC address.

7. The system of claim 5, wherein the memory comprises a searchable data structure, wherein the searchable data structure comprises a MAC group structure, an array, a binary tree, a linked list, a red-black tree, a table, or any other searchable data structure for organizing data that comprises the at least one MAC address.

8. The system of claim 5, wherein each at least one MAC address is assignable to a network traffic group ID of one or more network traffic group IDs, wherein the one or more network traffic group IDs comprise at least one known MAC address, and wherein one or more new network traffic group IDs are creatable using the user input device of the network traffic control device.

9. The system of claim 8, wherein for each at least one data packet received by the network traffic control device, the network traffic control device performs a check to determine whether the at least one MAC address associated with each such at least one data packet is a MAC address that is known to the network traffic control device or a new and unknown MAC address, wherein the check is performed by searching the memory of the network traffic control device for the presence of the at least one MAC address.

10. The system of claim 9, wherein if the at least one MAC address of the at least one data packet received by the network traffic control device is known, the network traffic control device determines to which network traffic group ID of the one or more network traffic group IDs the at least one MAC address of the at least one data packet is assigned based on MAC address data in the memory.

11. The system of claim 9, wherein if the at least one MAC address of the at least one data packet received by the network traffic control device is new and unknown, the network traffic control device permits the at least one MAC address to be assigned to an existing network traffic group ID or to a new network traffic group ID using the user input device.

12. The system of claim 11, wherein the user input device of the network traffic control device is usable to assign each network traffic group ID a unique annotation that is viewable on the display monitor; and wherein the new network traffic group ID is assignable a unique annotation using the user input device; and wherein the unique annotation indicates both the network traffic group ID and the current status that visually indicates whether the at least one data packet from the at least one MAC address is allowed or blocked.

13. The system of claim 12, wherein the current status that is allowed permits communication of the at least one data packet from an allowed MAC address assigned to an allowed network traffic group ID comprising a unique annotation that indicates the current status as allowed; and wherein the status that is blocked denies communication of the at least one data packet from a blocked MAC address assigned to a blocked network traffic group ID comprising a unique annotation that indicates the current status as blocked.

14. The system of claim 13, wherein if the at least one data packet originates from a MAC address associated with a network traffic group ID comprising a current status that is allowed, the at least one data packet is forwarded to the at least one network-connected device; and wherein if the at least one data packet originates from a MAC address associated with a network traffic group ID comprising a current status that is blocked, the at least one data packet is discarded and is not forwarded to the at least one network-connected device.

15. The system of claim 1, wherein the system allows or blocks a process for which initiation is sought by allowing or blocking the instruction received from the user input device.

16. An article of manufacture comprising a network traffic control device for securing a first network-connected device from an online security threat when the first network-connected device is communicating with a second network-connected device, the network traffic control device comprising:
a device for receiving at least one data packet to or from the first network-connected device; wherein the at least one data packet contains a media access control (MAC) address of the first network-connected device and an IP address of a second network-connected device;
a user input device for receiving an instruction from a user;
a device for either allowing or blocking the transmission of the at least one data packet;
a memory for storing MAC address data related to MAC addresses that the network traffic control device recognizes as known, wherein each MAC address is associated in the memory with a network traffic group ID of a group of one or more network traffic group IDs; and
an interface for assigning each MAC address to one network traffic group ID using the user input device and using the user input device to designate at least one allowed or blocked traffic requester for each at least one network traffic group ID;
wherein the device for either allowing or blocking the transmission of the at least one data packet allows the transmission of the at least one data packet if the MAC address of the first network-connected device is associated with a network traffic group ID and the IP address of the second network-connected device belongs to an allowed traffic requester for that network traffic group ID and blocks the transmission of the at least one data packet if the MAC address of the first network-connected device is associated with a network traffic group ID and the IP address of the second network-connected device belongs to a blocked traffic requester for that network traffic group ID.

17. The network traffic control device of claim 16, wherein the network traffic control device also controls the transmission of a data packet being transmitted by the network-connected device to another device connected to a communications network to which the network traffic control device is connected.

18. The network traffic control device of claim 16, wherein the network traffic control device is communicatively connected to the network-connected device by a network connection for transmitting data packets to or from the network traffic control device.

19. The network traffic control device of claim 16, wherein the network traffic control device is communicatively connected to a communications network for transmitting the at least one data packet to and from the network traffic control device to another device connected to the communications network.

20. The network traffic control device of claim 16, further comprising a display monitor for displaying the interface; wherein the allow status and block status are each visually represented on the interface on the display monitor.

21. A network traffic control system for securing a network-connected device from an online security threat, the system comprising
a network traffic control device that translates one or more remote IP addresses contained in one or more data packets that desire to enter or exit one or more network interface cards into one or more traffic requester names;
wherein the network traffic control device comprises:
a processor and associated memory; and
the at least one network interface card for receiving and transmitting the one or more data packets;
wherein the network traffic control device secures the at least one network-connected device when the network-connected device attempts to communicate with a communications network; and
a display connected to the network traffic control device for dynamically displaying one or more traffic requester names and their associated status at the time each of the one or more data packets attempts to enter or exit the one or more network interface cards;
wherein the network traffic control device comprises an interface viewable on the display to allow a user to change the status of one or more of the one or more traffic requester names at the time each of the one or more data packets attempts to enter or exit the one or more network interface cards.

22. The network traffic control system of claim 21, wherein the one or more traffic requester names comprise at least one domain name.

23. The network traffic control system of claim 21, wherein the one or more traffic requester names comprise at least one domain name owner's name.

24. A system for securing a network-connected device from an online security threat, the system comprising:
a network traffic control device, further comprising software, for translating an Internet protocol (IP) address contained by network traffic into a user recognizable name, wherein the network traffic control device also comprises a processor and associated memory, a user input device for receiving an instruction from a user, and at least one network interface card for receiving and transmitting the one or more data packets; wherein the network traffic control device secures the at least one network-connected device when the network-connected device attempts to communicate with a communications network; and a display connected to the network traffic control device to display the user recognizable name at a time when blocked network traffic, which contains the IP address, attempts to communicate to or from the IP address of another network-connected device.

25. The system of claim 24, further comprising a means for toggling using the user input device to change a status of the network traffic comprising the IP address between a blocked status and an allowed status while the user recognizable name is displayed on the display, wherein the user input device is manipulable to operate the means for toggling.

26. The system of claim 25, wherein the user recognizable name is a domain name or a domain name owner's name.

27. The system of claim 24, wherein the user recognizable name is a domain name or a domain name owner's name.

28. A system for securing a network-connected device from an online security threat, the system comprising:

a network traffic control device, further comprising software, for translating an Internet protocol (IP) address contained by network traffic into a user recognizable name, wherein the network traffic control device also comprises a processor and associated memory, a user input device for receiving an instruction from a user, and at least one network interface card for receiving and transmitting the one or more data packets; wherein the network traffic control device secures the at least one network-connected device when the network-connected device attempts to communicate with a communications network;

a display connected to the network traffic control device to display the user recognizable name at a time when allowed network traffic, which contains the IP address, attempts to communicate to or from the IP address of another network-connected device; and a means for toggling operable by the user input device for changing a status of the network traffic comprising the IP address between an allowed status and a blocked status while the user recognizable name is displayed on the display.

29. The system of claim 28, wherein the user recognizable name is a domain name or a domain name owner's name.

30. A security platform for enhancing computer and network security, the security platform comprising:

at least one network-connected device, wherein the at least one network-connected device comprises at least one network interface card for receiving and transmitting data packets;

at least one network traffic control device comprising:
at least one network interface card for receiving and transmitting data packets;
a display interface;
a user input device;
a processor and associated memory for recording and retrieval of data;
for at least one DNS reply, a process for recording at least one received domain name and an associated IP address of the at least one received domain name in the memory;

for the at least one DNS reply, a process for setting a default status in association with the at least one received domain name and for recording a representation of the at least one received domain name and its associated default status in the memory;

a process for intercepting at least one non-DNS IP-level packet destined to or transmitted from the at least one network-connected device;

for the at least one non-DNS IP-level packet, a process for determining the domain name of the remote host to which communication to the at least one network-connected device is attempted;

wherein the process for determining the domain name retrieves:
(i) the at least one domain name that is associated with the IP address from the data recorded in the memory, and
(ii) the current status associated with the at least one domain name from the data recorded in the memory, and wherein the representation of the domain name and a representation of the current status of the domain name are displayed on the display interface; and a process executed in response to an instruction from the user input device to change the current status for the at least one domain name displayed in the representation;

wherein the status change for the domain name is recorded as the current status; and wherein the at least one non-DNS IP-level packet associated with the at least one network-connected device is discarded if the current status is blocked.

31. The security platform of claim 30, wherein the at least one network-connected device is communicatively connected to a network such that the at least one network traffic control device receives a MAC address of the at least one network-connected device within the communication data packets; and wherein the network traffic control device, in response to at least one newly encountered MAC address from the at least one network-connected device, receives user input via the user input device to assign the MAC address to a network traffic group ID.

32. The security platform of claim 31, wherein the display of the domain name and its associated status is presented along with a representation of each network traffic group ID attempting to communicate with the domain name at the time one or more members of the network traffic group ID attempts to communicate with the domain name.

33. The security platform of claim 32, wherein at least one domain name associated with at least one network traffic group ID is selectable by the user at the time one or more members of the network traffic group ID is attempting to communicate with the domain name;

wherein the selection causes a change in status of the domain name solely for the network traffic group IDs selected by the user whereas the current status of all other network traffic group IDs remains unaffected; and wherein at least one non-DNS IP-level packet destined to or received from the at least one network-connected device is allowed if the current status of the domain name is allowed for the network traffic group ID to which the at least one network-connected device belongs or is blocked if the current status of the domain name is blocked for the network traffic group ID to which the at least one network-connected device belongs.

* * * * *